US011796074B2

(12) United States Patent
Anderson et al.

(10) Patent No.: US 11,796,074 B2
(45) Date of Patent: Oct. 24, 2023

(54) MULTIPORT VALVE

(71) Applicant: Mogas Industries, Inc.

(72) Inventors: Alfred Lewis Anderson, Houston, TX (US); Asmaa Sadek Kassab, Cypress, TX (US); Phillip M. Inman, Houston, TX (US)

(73) Assignee: Mogas Industries, Inc., Houston, TX (US)

( * ) Notice: Subject to any disclaimer, the term of this patent is extended or adjusted under 35 U.S.C. 154(b) by 34 days.

(21) Appl. No.: 17/472,624

(22) Filed: Sep. 11, 2021

(65) Prior Publication Data

US 2022/0003327 A1 Jan. 6, 2022

Related U.S. Application Data

(63) Continuation of application No. 16/493,169, filed as application No. PCT/US2019/032963 on May 17, 2019, now Pat. No. 11,118,695.
(Continued)

(51) Int. Cl.
*F16K 11/087* (2006.01)
*F16K 5/06* (2006.01)
(Continued)

(52) U.S. Cl.
CPC .......... *F16K 11/0876* (2013.01); *C10B 31/12* (2013.01); *C10B 55/00* (2013.01); *F16K 27/067* (2013.01); *E21B 7/28* (2013.01); *F16K 5/0605* (2013.01); *F16K 5/0636* (2013.01); *F16K 5/0663* (2013.01); *F16K 5/0689* (2013.01); *F16K 11/056* (2013.01); *F16K 11/087* (2013.01)

(58) Field of Classification Search
CPC .. F16K 11/0876; F16K 27/067; F16K 11/087; F16K 11/056; F16K 5/0605; F16K 5/0663; C10B 31/12; C10B 55/00; E21B 7/28
See application file for complete search history.

(56) References Cited

U.S. PATENT DOCUMENTS 2,492,140 A * 12/1949 Fike ..................... F16K 11/0876
251/297
2,996,083 A * 8/1961 Huska ................... F16K 11/085
137/625.11
(Continued)

*Primary Examiner* — Matthew W Jellett
*Assistant Examiner* — Christopher D Ballman
(74) *Attorney, Agent, or Firm* — Lundeen & Lundeen PLLC; Daniel N Lundeen

(57) ABSTRACT

Multiport valve with outlets transverse to the inlet useful as a coker switch valve. A sealed lower sleeve assembly provides semi-trunnion ball support. An upper part of the outlet seat recesses is formed in the bonnet, and a lower part in the valve body, which together bias a resilient member to load the seats, independently of end connections. Before bonnet assembly, when the ball is rotated to face a body outlet, there is sufficient space in the seat recesses to insert the seat, slide the seat onto the ball, and then insert the resilient member. When all the seats and resilient members are in place, engagement of the bonnet biases the upper part of the resilient members to load the seat. In valve operation, an enlarged ball outlet bore can straddle two outlet ports and maintain process media flow during switching. Also, methods of assembling, operating, and servicing the valve.

23 Claims, 14 Drawing Sheets

Related U.S. Application Data

(60) Provisional application No. 62/673,703, filed on May 18, 2018, provisional application No. 62/673,581, filed on May 18, 2018.

(51) Int. Cl.
*C10B 31/12* (2006.01)
*C10B 55/00* (2006.01)
*F16K 27/06* (2006.01)
*F16K 11/056* (2006.01)
*E21B 7/28* (2006.01)

(56) References Cited

U.S. PATENT DOCUMENTS

| | | | | |
|---|---|---|---|---|
| 4,158,369 A * | 6/1979 | Storzinger | ............. | B60T 15/04 303/79 |
| 4,175,577 A * | 11/1979 | Kacal | ................... | F16K 5/0636 251/315.08 |
| 4,253,640 A * | 3/1981 | Priese | ................... | F16K 5/0647 91/189 R |
| 4,441,524 A * | 4/1984 | Mese | ................... | F16K 5/0689 251/315.12 |
| 4,637,421 A * | 1/1987 | Stunkard | ............. | F16K 5/0673 251/315.08 |
| 4,685,488 A * | 8/1987 | Corbin | ................ | F16K 11/0876 137/328 |
| 4,915,133 A * | 4/1990 | Harrison | ............. | F16K 11/0873 251/315.15 |
| 4,964,436 A * | 10/1990 | Hein | ................... | F16K 11/0873 251/174 |
| 5,727,595 A * | 3/1998 | Eminger | ............. | F16K 11/0876 251/86 |
| 5,727,596 A * | 3/1998 | Eminger | ............. | F16K 11/0876 251/183 |
| 5,799,928 A * | 9/1998 | Siver | ..................... | F16K 5/0605 251/192 |
| 5,881,770 A * | 3/1999 | Neill | ................... | F16K 11/0743 251/297 |
| 5,906,224 A * | 5/1999 | Tupper | ................ | F16K 11/0876 137/835 |
| 6,000,430 A * | 12/1999 | Nafz | ................... | F16K 11/0876 137/625.11 |
| 6,196,266 B1 * | 3/2001 | Breda | ................ | F16K 11/0853 137/454.6 |
| 6,240,946 B1 * | 6/2001 | Beasley | ................ | C10B 31/12 137/15.07 |
| 7,506,664 B2 * | 3/2009 | Norris | ................ | F16K 11/0876 137/625.42 |
| 8,375,977 B2 * | 2/2013 | Jones | ................... | F16K 5/0605 137/240 |
| 8,646,752 B2 * | 2/2014 | Beasley | ................ | F16K 5/0678 251/315.01 |
| 8,899,269 B2 * | 12/2014 | Seim | ................... | F16K 11/085 137/454.6 |
| 10,113,652 B2 * | 10/2018 | Balan | ..................... | B23P 19/00 |
| 10,400,900 B2 * | 9/2019 | Kindersley | ........... | F16K 5/0689 |
| 2007/0068584 A1 * | 3/2007 | Murdock | ............ | F16K 11/0873 137/625.47 |

\* cited by examiner

| Position | Ball Orientation | View C-C | View B-B |
|---|---|---|---|
| C |  |  |  |
| C→B, 30° |  |  |  |
| C→B, 60° |  |  |  |
| C→B, 90° |  |  |  |
| B 120° |  |  |  |

MULTIPORT VALVE

CROSS REFERENCE TO RELATED APPLICATIONS

This application is a continuation of U.S. Ser. No. 16/493,169, filed Sep. 11, 2019, now U.S. Pat. No. 11,118,695, which is a national stage entry of PCT/US19/32693, filed May 17, 2019, which claims the benefit of and priority to U.S. Provisional Application Ser. No. 62/673,581 and U.S. Provisional Application Ser. No. 62/673,703, both filed May 18, 2018, the disclosures of which are fully incorporated herein by reference.

BACKGROUND

A coker switch valve (CSV) is often used to divert a flow of heavy oil from one coke drum to another. Typical temperatures of the process stream are over 200° C. and sometimes as high as 500° C., with typical times between switching coke drums of 16 to 24 hours. The heavy oil will turn into coke when held at these temperatures for several hours. If heavy oil enters and forms coke in the valve cavity or seats, the CSV may seize. Moreover, switching of the CSV during production results in a brief interruption, typically a 40% reduction in process flow. The transient flow restriction can result in hot spots within the heaters, coke deposition, fouling, and so on, leading to early maintenance requirements and/or equipment failure. Often, the firing rate in the heaters and/or the flow rate are reduced for the switching operation, which complicates the switching process and reduces efficiencies.

Conventional CSVs typically have a flow control element or ball that floats by loading bellows resilient members in tubular seats at the outlet ports using flanged piping connections. Bellows resilient members are prone to fouling and provide additional potential leak paths. The loading of the valve seats is complicated by coupling the pipe line loads to the seat loads. During start up operation, thermal growth in the associated piping system can change the mechanical strains on the end connections and thus alter the loading on the seats. If the loading on all outlet seats is not balanced properly, wiping forces are not equal and the ball can become misaligned. High loading stresses also lead to increased operating torque. To access and service the outlet valve seat assemblies, the line must be disconnected from the CSV, de-coupling the loading, and altering the line loading. Moreover, servicing of the associated piping can result in changing the stresses on the outlet valve seat assemblies, and may require the outlet valve seat assembly loading to be adjusted and/or valve seizure. Startups and valve maintenance are thus problematic.

During operation, the prior art CSVs are typically purged with steam, which constantly flows into the process streams, even between switching operations. Steam consumption can be excessive, and yet process fluid can still enter and form coke in the seats and valve body cavity around the ball.

Patent document US 2018/0003304 discloses an attempt to maintain a flow of the heavy oil through the valve cavity around the ball to avoid dead spots where coke could form. This reference discloses apertures to maintain fluid flow between the process media flowing through the ball and the area in the valve cavity around the bellows seals. Other patent documents promoting the flow of process media into the valve cavity include U.S. Pat. No. 5,185,539 and US 2012/0012770. Other patent documents of general background interest include: U.S. Pat. Nos. 3,150,681; 3,156,260; 3,519,017; 4,175,577; 5,083,582; 5,156,183; 6,240,946; 6,378,842; 6,799,604; 9,010,727; US 2007/0068584 A1; US 2015/0285143 A1; US 2017/0138504 A1; and US 2018/0094737 A1.

There remains a need in the art to avoid or minimize one or more of: flow interruption during switching operations, process media entry of the valve cavity, coke formation and/or buildup, valve seizure, ball misalignment, uneven seat loading, seat leakage, complicated steam purging, excessive steam consumption, use of prone-to-fouling bellows resilient members, excessive torque, complicated repair and trim replacement, poor reliability, and/or other drawbacks associated with known CSVs.

SUMMARY

Applicant herein addresses many problems associated with prior art coker switching valves or CSVs by providing embodiments of a multiport valve with a sealed semi-trunnion arrangement to support the spherical flow control element, hereinafter sometimes referred to as the ball. A lower part of the outlet seat recesses is formed in the main body of the valve, while the upper part of the outlet seat recesses is formed in the bonnet. The bonnet and body together bias a respective resilient member such as a Belleville resilient member to load the seat, maintaining alignment of the ball and equalizing stresses, independently of end connection loads. The outlet of the ball can have a larger bore than the ball inlet such that the outlet flow area is larger, e.g., at least 50% larger area than the inlet. Following removal of the bonnet and resilient member, there is sufficient space in the seat recesses to remove the valve seats. By rotating the outlet of the ball to each outlet, the seats can be removed sequentially, providing a true top bonnet entry valve.

The present design in various embodiments overcomes many drawbacks of the prior art CSVs by providing one or more of the following exemplary advantages: the present design maintains alignment of the ball and equalizes wiping forces, inhibits or prevents uneven seat loading and leakage, reduces the number of potential leak paths, reduces operating torque, simplifies repair and trim replacement, can eliminate bellows resilient members and associated steam purge inlets, can simplify steam purging, increases switching reliability, can evacuate body cavity of process media before and after switching, requires appreciable steam consumption only during switching, reduces steam consumption between switching operations, lowers overall steam consumption, minimizes the entry of process media into the valve body cavity, provides less interruption of process flow during switching, and so on.

In one aspect of the invention, embodiments disclosed herein provide a multiport valve, comprising: a valve body comprising a flow path between a body inlet coaxial to a first axis and a plurality of body outlets each oriented at an angle transverse to the first axis; and a spherical flow control element disposed within a cavity, wherein the flow control element comprises a ball inlet having a ball inlet area radially arranged about the first axis, and a ball outlet having a ball outlet area larger than the ball inlet area, radially arranged at the transverse angle to the first axis, the flow control element rotatable about the first axis to selectively align the ball outlet with each of the plurality of body outlets separately and to overlap the ball outlet with portions of two of the body outlets. The body outlets can have a cross-sectional flow area tapering down from adjacent to the flow control element to an end connection, e.g., matching the ball outlet area adjacent to the flow control element and matching the ball inlet area at the end connections.

In another aspect of the invention, embodiments disclosed herein provide a multiport valve, comprising: a valve body comprising a flow path between a body inlet coaxial to a first axis and a plurality of body outlets each oriented at an angle transverse to the first axis. A spherical flow control element is disposed within a cavity of the valve body comprising a ball inlet having a ball inlet area radially arranged about the first axis, and a ball outlet radially arranged at the transverse angle to the first axis. The flow control element is rotatable about the first axis to selectively align the ball outlet with each of the plurality of body outlets separately, and to overlap the ball outlet with portions of two of the body outlets. The valve comprises a like plurality of outlet seat recesses. Each outlet seat recess is radially arranged about a respective one of the body outlets, and each receives a respective outlet valve seat assembly in sealing engagement between the valve body and the flow control element. The valve comprises a like plurality of resilient members, and each biases a respective one of the outlet valve seat assemblies against the flow control assembly. An inlet sleeve assembly is radially arranged about the body inlet in sealing, biased engagement between the valve body and the flow control element. The valve body comprises a lower main body sealingly engaged with an upper bonnet. The body inlet is disposed through the main body. A portion of each body outlet is formed through the main body and a remaining portion of each body outlet is formed by the bonnet. A lower portion of each outlet seat recess is formed into the main body, whereby a corresponding lower portion of each resilient member is biased against the main body. An upper portion of each outlet seat recess is formed into the bonnet, whereby a corresponding upper portion of each resilient member is biased against the bonnet.

In a further aspect of the invention, embodiments herein provide a method of operating a coker switch valve, comprising: (a) providing the multiport valve described herein; (b) continuously supplying steam to a plurality of steam purge inlets to the body cavity; (c) rotating the flow control element to switch alignment of the ball outlet from one of the body outlets to another one of the body outlets while maintaining the steam supply; (d) continuously flowing process media through the flow path while rotating the flow control element; and (e) draining the steam and process media from the cavity after the alignment switching.

In yet another aspect of the invention, embodiments herein provide a method to assemble the valve described herein. The assembly method comprises: (a) inserting the inlet sleeve assembly into engagement with the main body about the body inlet; (b) inserting the flow control element into the main body to engage the inlet sleeve assembly; (c) inserting each of the outlet valve seat assemblies and resilient members into the lower portion of the outlet seat recesses, wherein each insertion comprises: (i) orienting the ball outlet towards one of the body outlets; (ii) inserting one of the outlet seat assemblies into the lower portion of the respective outlet seat recess; and (iii) sliding the respective outlet seat assembly into engagement with the flow control element; and (d) engaging the bonnet with the main body to bias the upper portions of the resilient members against respective upper portions of the outlet seat assemblies.

Further still, an aspect of the invention provides embodiments for a method of servicing the valve described herein. The servicing method comprises: (a) removing the bonnet from the main body; (b) removing each of the outlet valve seat assemblies and resilient members from the main body, wherein the removal comprises: (i) orienting the ball outlet towards a one of the body outlets; (ii) removing the respective resilient member from the lower portion of the respective outlet seat recess; and (iii) disengaging the respective outlet seat assembly from the lower portion of the respective outlet seat recess; (c) removing the flow control element from the main body; and (d) removing the inlet sleeve assembly from the main body.

DETAILED DESCRIPTION

Figure 1:
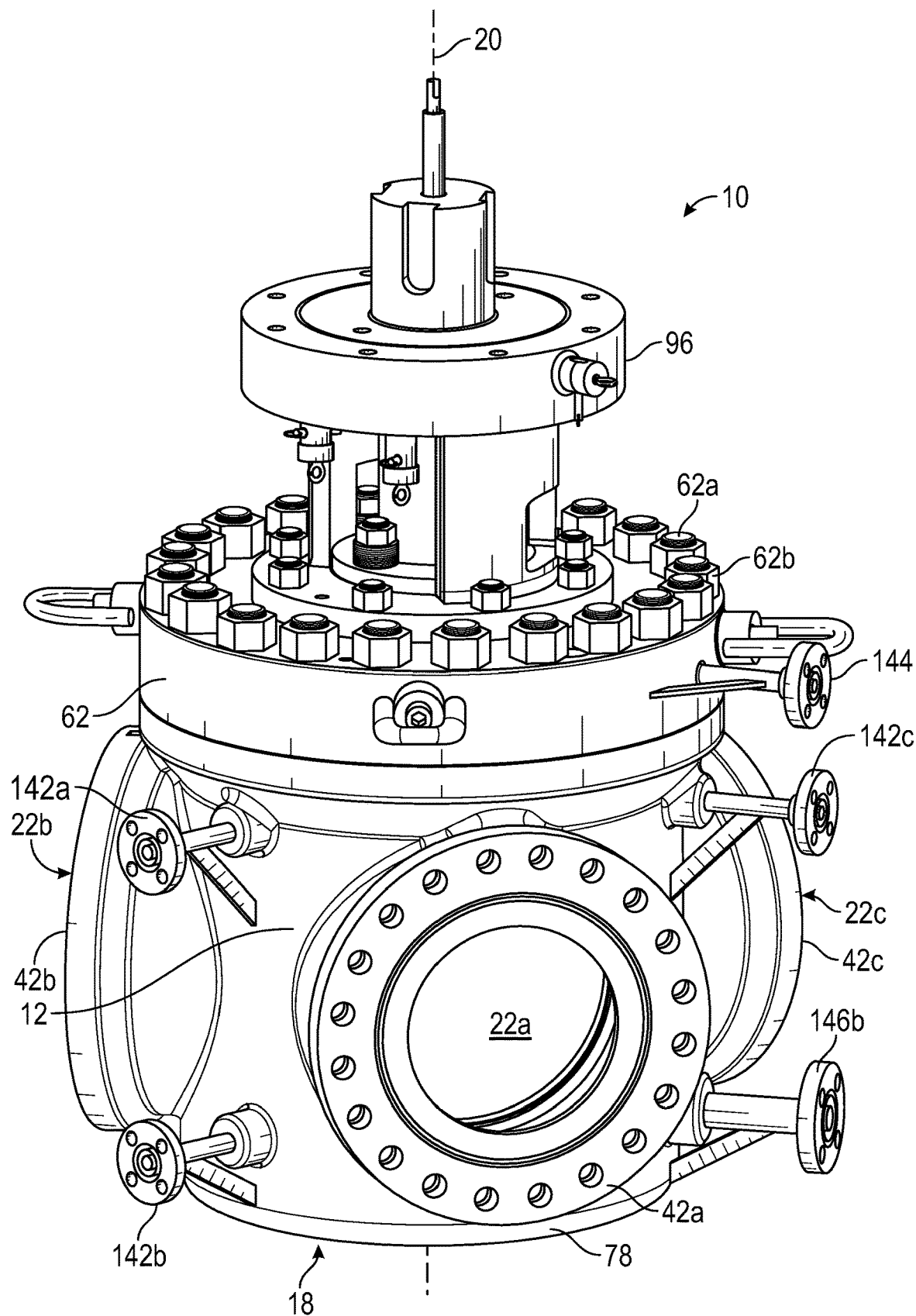
FIG. 1 shows a side perspective view of a multiport valve according to embodiments of this invention.

The instant disclosure is directed to a multiport valve comprising a flow control element, sometimes referred to herein as a ball, disposed within a valve body having a selectable flow path between a body inlet and a plurality of body outlets each oriented at an angle transverse to the inlet.

In embodiments according to one aspect of the invention, a multiport valve comprises a valve body comprising a flow path between a body inlet coaxial to a first axis and a plurality of body outlets each oriented at an angle transverse to the first axis. A spherical flow control element is disposed within a cavity of the valve body. The flow control element comprises a ball inlet having an area radially arranged about the first axis. A ball outlet is radially arranged at the transverse angle to the first axis, and has an outlet area larger than the ball inlet area, preferably at least 50% larger, more preferably at least 65% larger. The flow control element is preferably rotatable about the first axis to selectively align the ball outlet with each of the plurality of body outlets separately, and to overlap the ball outlet with portions of two of the body outlets. The body outlets have a cross-sectional flow area tapering down from adjacent to the flow control element to an end connection.

In any embodiment, the valve can also have a like plurality of outlet valve seat assembly recesses. Each valve seat recess can be radially arranged about a respective one of the body outlets. Each valve seat recess can receive a respective outlet valve seat assembly in sealing engagement between the valve body and the flow control element. The valve can also have a like plurality of resilient members, each biased between the valve body and a respective one of the outlet valve seat assemblies. An inlet sleeve assembly can be radially arranged about the body inlet in sealing, biased engagement between the valve body and the flow control element.

In any embodiment, the valve body can comprise a lower main body sealingly engaged with an upper bonnet, wherein the body inlet is disposed through the main body, and wherein a portion of each body outlet is formed through the main body and a remaining portion of each body outlet is formed by the bonnet. A lower portion of each outlet seat recess can be formed into the main body, whereby a corresponding lower portion of each resilient member is biased against the main body. An upper portion of each outlet seat recess can be formed into the bonnet, whereby a corresponding upper portion of each resilient member is biased against the bonnet.

In any embodiment, the flow control element, the outlet valve seat assemblies, the resilient members, the inlet sleeve assembly, and the outlet seat recesses can be dimensioned and arranged to allow sequential removal of the resilient members, disengagement of the outlet valve seat assemblies from the flow control element, removal of the outlet valve seat assemblies, removal of the flow control element, and removal of the inlet sleeve assembly from the valve body exclusively through an opening created by disengagement of the bonnet from the main valve body. Similarly, the flow control element, the outlet valve seat assemblies, the resilient members, the inlet sleeve assembly, and the outlet seat recesses can be dimensioned and arranged to allow sequential insertion of the inlet sleeve assembly into the valve body, insertion of the flow control element into the valve body, insertion of the outlet valve seat assemblies and engagement with the flow control element, the insertion of the resilient members into the outlet seat recesses, exclusively through the opening created by disengagement of the bonnet from the valve body.

Preferably, a maximum distance between an outer edge of the spherical flow control element and an inner surface of the outlet seat recesses is less than 1 cm.

In any embodiment herein, the cross-sectional flow area of the body outlets can match the ball outlet area adjacent to the flow control element, and can match the ball inlet area at the end connections.

In another aspect of the invention, a multiport valve can comprise a valve body comprising a body inlet coaxial to a first axis and a plurality of body outlets each oriented at an angle transverse to the first axis; and a spherical flow control element disposed within a cavity of the valve body comprising a ball inlet having a ball inlet area radially arranged about the first axis, and a ball outlet radially arranged at the transverse angle to the first axis. The flow control element is rotatable about the first axis to selectively align the ball outlet with each of the plurality of body outlets separately, and preferably also rotatable to overlap the ball outlet with portions of two of the body outlets. The valve further comprises: a like plurality of outlet seat recesses, each outlet seat recess radially arranged about a respective one of the body outlets, each outlet seat recess receiving a respective outlet valve seat assembly in sealing engagement between the valve body and the flow control element; a like plurality of resilient members, each biasing a respective one of the outlet valve seat assemblies against the valve body; and an inlet sleeve assembly radially arranged about the body inlet in sealing, biased engagement between the valve body and the flow control element. The valve body can comprise a lower main body sealingly engaged with an upper bonnet. A lower portion of each outlet seat recess is formed into the main body, whereby a corresponding lower portion of each resilient member is biased against the main body. Similarly, an upper portion of each outlet seat recess is formed into the bonnet, whereby a corresponding upper portion of each resilient member is biased against the bonnet.

In any embodiment, the main body can comprise U-shaped recesses defining the lower portions of the outlet seat recesses and alignment guideways to receive respective alignment ribs of the bonnet In any embodiment, the valve can further comprise a valve stem extending from the flow control element through an opening through the bonnet, whereby the flow control element can be rotated by rotating the stem to switch alignment of the ball outlet with a selected one of the body outlets. The valve can also comprise a stem thrust bearing and a bushing oriented about the stem in rotational contact between a surface disposed into the spherical flow control element and a corresponding surface disposed into the bonnet radially about the valve stem opening.

In any embodiment, the inlet sleeve assembly can comprise a sleeve member, a sleeve resilient member biased between the main body and a lower end of the sleeve member, a sleeve bearing disposed between an upper end of the sleeve member and a circular groove formed in a lower end of the flow control element, and one or more seal rings disposed between the sleeve member, the flow control element, and/or the main body.

In any embodiment, the valve can further comprise respective biasing portions formed in the upper portions of the outlet valve seat assembly recesses arranged to engage the respective resilient members. The outlet valve seat assemblies can preferably respectively comprise one or more seals in sealing contact between a seat ring and the outlet seat recess, more preferably where the one or more seals are disposed within respective grooves disposed into an outer surface of the seat ring.

In any embodiment, the valve can comprise a purge inlet to the cavity between the valve body and the and flow control element, and a drain to remove purge fluid from the cavity between the body and the flow control element.

In any embodiment, an area of the ball outlet can be larger than an area of the ball inlet, e.g., at least 50% greater, or at least 65% greater. Preferably, the body outlets have a cross-sectional flow area tapering down from adjacent to the flow control element to an end connection, e.g., the cross-sectional flow area of the body outlets matches the ball outlet area adjacent to the flow control element and matches the ball inlet area at the end connections.

In another aspect of the invention, a method of operating a coker switch valve can comprise the steps of: (a) providing a multiport valve as described herein; (b) continuously supplying purge fluid such as steam to a plurality of steam purge inlets to the body cavity; (c) rotating the flow control element to switch alignment of the ball outlet from one of the body outlets to another one of the body outlets while maintaining the steam supply; (d) continuously flowing process media through the valve while rotating the flow control element; and (e) draining purge fluid and process media from the cavity after the alignment switching.

In any embodiment, the process media flow in step (d) can be maintained at a substantially constant rate immediately before, during, and immediately after the alignment switching, preferably wherein the switching maintains from 80 or 90 to 100 percent, e.g., 80-90 percent, of the process media flow relative to the process media flow immediately before and immediately after the switching. In a preferred embodiment, a volume of the purge fluid flow to the purge inlets, other than during switching in step (c) is limited to incidental leakage into process media.

In a further aspect yet, the invention provides embodiments of a method for servicing the valve described herein. The method comprises (a) removing the bonnet from the main body; (b) removing each of the outlet valve seat assemblies and resilient members from the main body, wherein the removal comprises: (i) orienting the ball outlet towards one of the body outlets; (ii) removing the respective resilient member from the lower portion of the respective outlet seat recess; (iii) disengaging the respective outlet seat assembly from the flow control element; and (iv) removing the respective outlet seat assembly from the lower portion of the respective outlet seat recess; (c) removing the flow control element from the main body; and (d) removing the inlet sleeve assembly from the main body.

If desired, the removal steps (a) to (d) are conducted in-line while the valve remains attached to process piping at end connections at the body inlet and at one or more body outlets.

In any embodiment, removing the resilient member from the main body can comprise: (I) providing a resilient member removal tool comprising a bottom appendage dimensioned to fit into the lower portion of the outlet seat recess between the main body and the resilient member, and a selectively retractable/extendable portion dimensioned to extend away from a face of the tool to engage an inner edge of the resilient member after the tool is inserted into position between the resilient member and the main body; (II) inserting the bottom appendage of the resilient member removal tool into the lower portion of the outlet seat recess between the resilient member and the main body until the extendable portion of the resilient member removal tool is positioned to engage the inner edge of a corresponding resilient member; (III) actuating the tool to extend the extendable portion towards the center of the valve away from the face of tool in an amount sufficient to engage the inner edge of the resilient member, and (IV) removing the tool from the lower portion of the outlet seat recess together with the resilient member.

Figure 2:
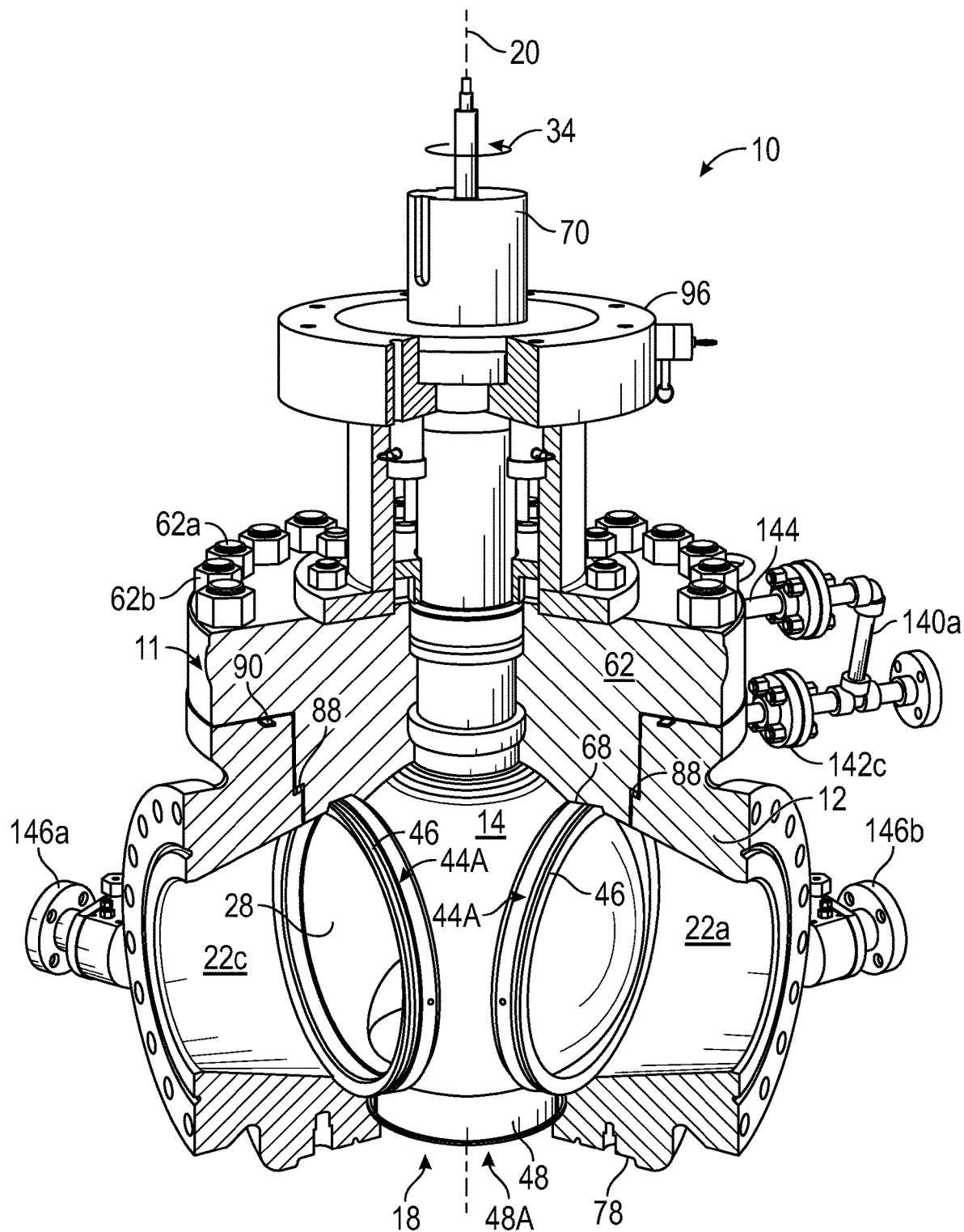
FIG. 2 is a cut-away perspective view of the multiport valve of FIG. 1.
Figure 3:
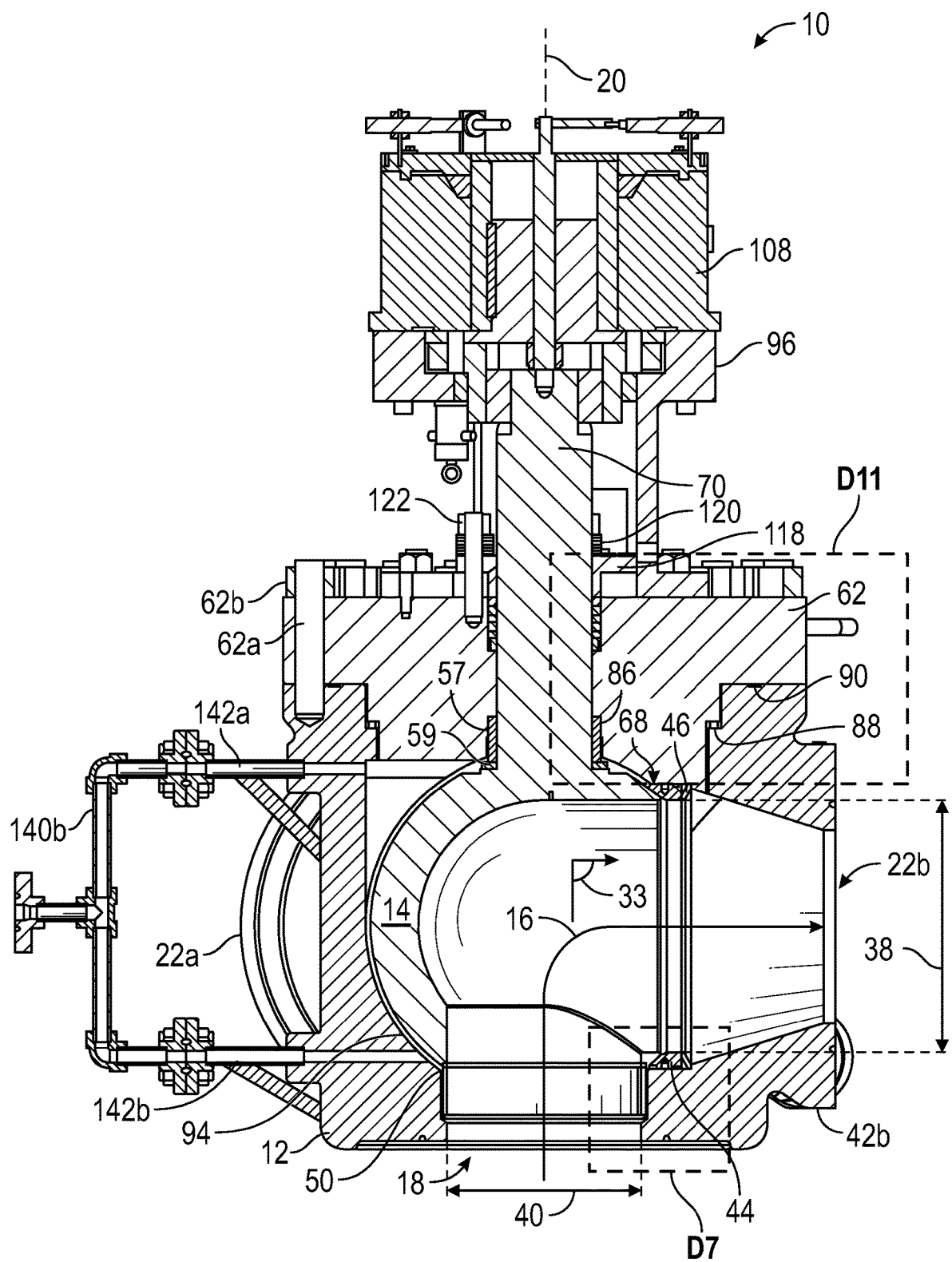
FIG. 3 is a side sectional view of the multiport valve of FIGS. 1-2, also including an actuator, according to embodiments of the present invention.
Figure 8:
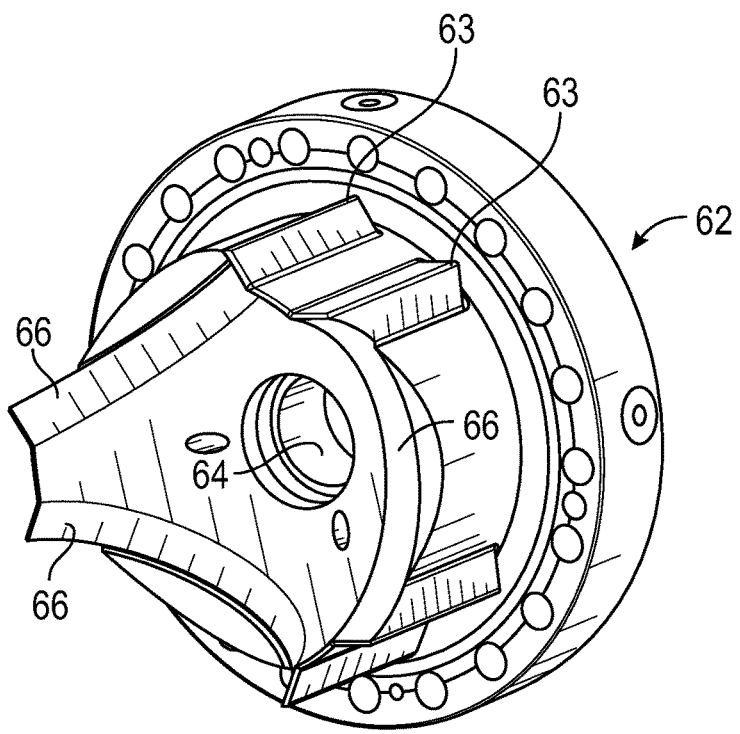
FIG. 8 is a perspective view of a bonnet in the multiport valve of FIGS. 1-7.

Reference is now made to the drawing figures in which like numeric or alphanumeric characters refer to like parts. FIG. 1 is a perspective view of the valve 10 of the invention showing the assembled valve body 12, bonnet 62, and optional top works 96; FIG. 2 is a cut away view showing ball 14 and preferred steam manifold 140a; and FIG. 3 is a side sectional view showing preferred steam manifold 140b and optional actuator 108. The valve 10 has two main pieces, a bottom piece or main valve body 12 (FIG. 4) and a top piece or bonnet 62 (FIG. 8), attached by means of studs 62a and nuts 62b (FIGS. 1-3).

As best seen in FIG. 3, process media entry into the valve 10 is from the bottom of the valve body 12 into the ball 14 following flow path 16 to transverse angle. The fluid passes from body inlet 18, into ball inlet 24 along central axis 20, to transverse ball outlet 28 formed at transverse angle 33, preferably 90 degrees with respect to axis 20, and then exits through one of three body outlets 22a, 22b, 22c, which are generically referred to herein as body outlet(s) 22. The body outlets 22 are radially spaced in the valve body at equal intervals, i.e., 120° apart and are oriented at angle 33 (e.g., 90°) to the body inlet 18. Use of the valve 10 is not limited to CSVs, but when the valve 10 is used as a CSV, outlet 22a typically directs flow to delayed coker drum A (not shown), outlet 22b to drum B (not shown), and outlet 22c to bypass the drums and recirculate to a heater (not shown). Although the valve 10 is illustrated herein with three outlets, it is also contemplated that it could have two outlets 180° apart or four outlets 90° apart, and so on.

As best seen in FIGS. 1-4, the valve 10 has a flanged inlet connection 78 and flanged outlet connections 42a, 42b, 42c (generically, 42), each of which is integral to the valve body 12. As best seen in FIG. 3, the outlet valve seat assemblies 44A are located independently within the valve body 12 and bonnet 62, without using bellows springs in a sleeve arrangement in each outlet that is common in the art.

Figure 5:
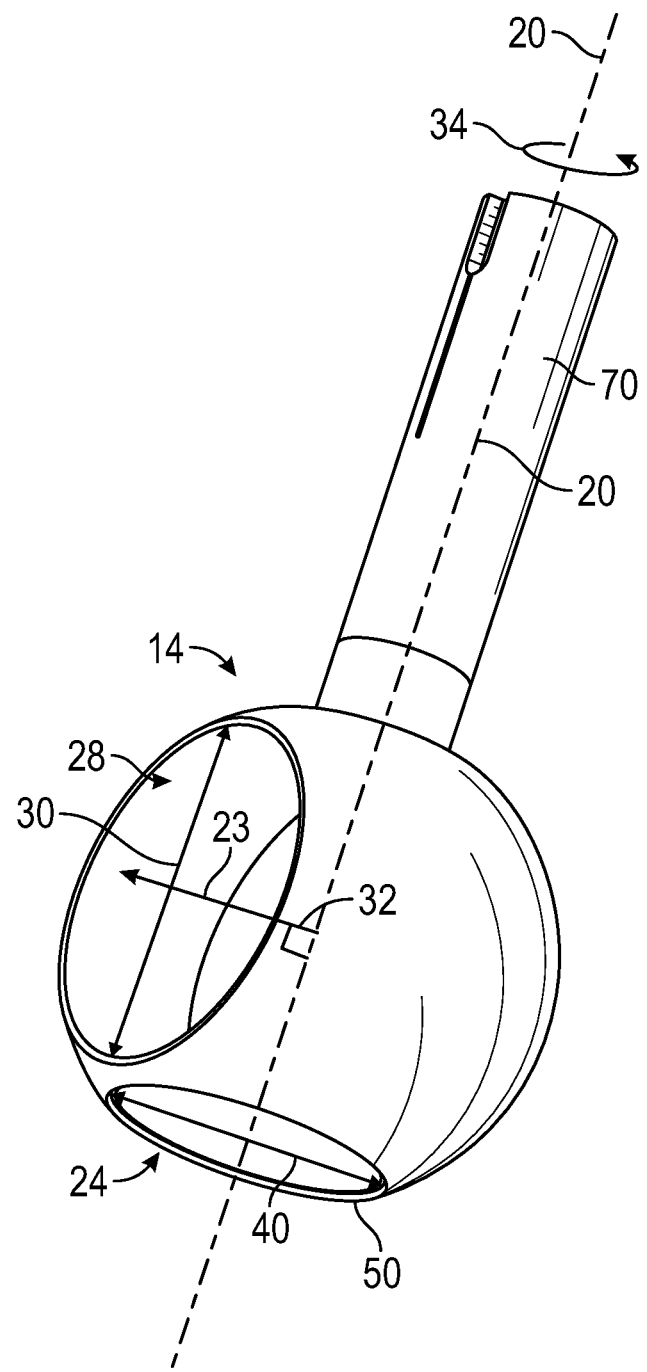
FIG. 5 is a perspective view of the flow control element in the multiport valve of FIGS. 1-4.

The ball 14 (FIG. 5) is provided with an integral valve stem 70 which passes through opening 64 in bonnet 62 (FIG. 8), often through a top works 96 to a powered actuator 108 (FIG. 3) by which the ball 14 can be rotated to the desired switching position as indicated by arrow 34 (FIG. 2), or it can be stroked manually using an appropriate wrench (not shown).

Figure 6:
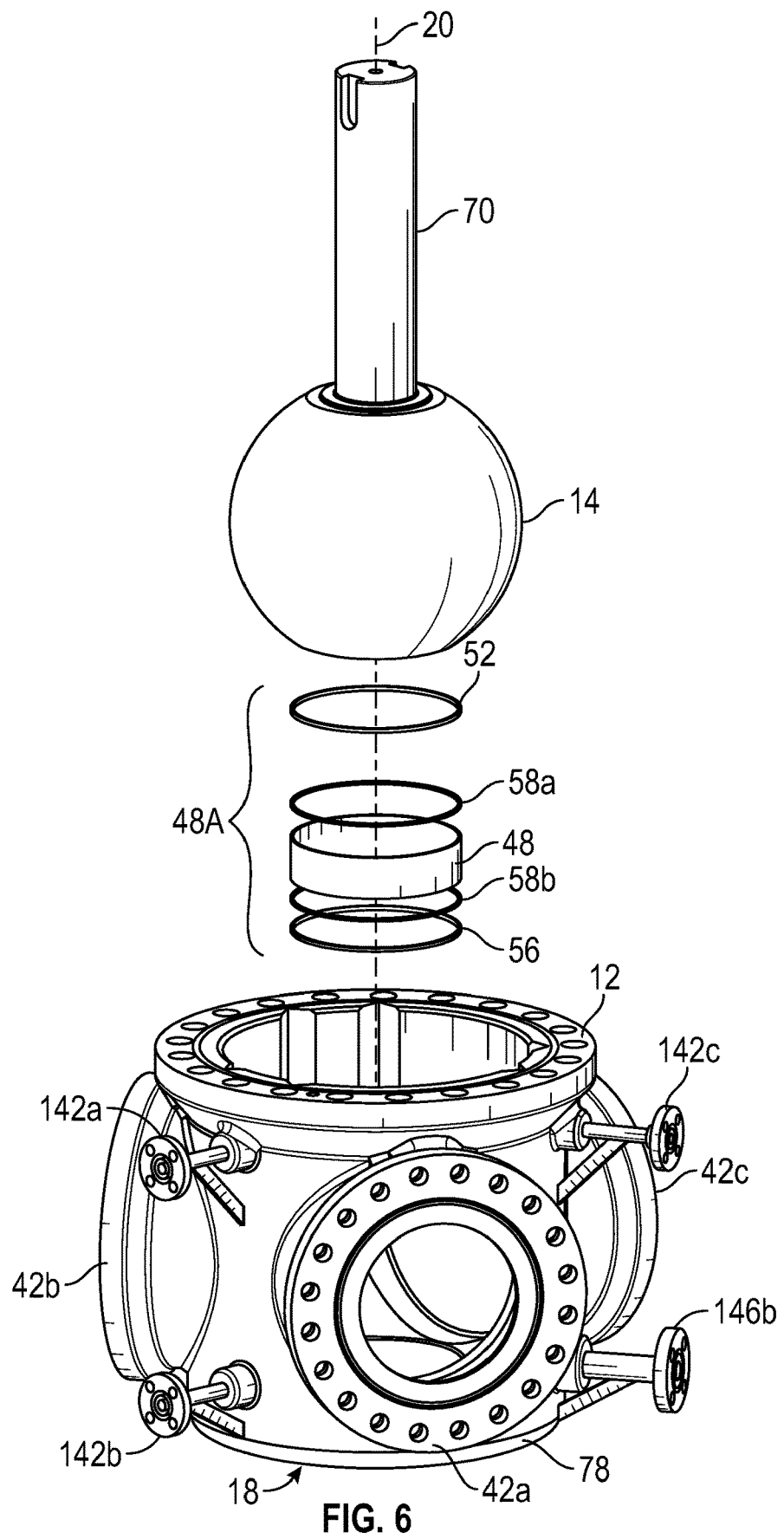
FIG. 6 is an exploded view showing the main body, inlet sleeve assembly, and flow control element in the multiport valve of FIGS. 1-5
Figure 7:
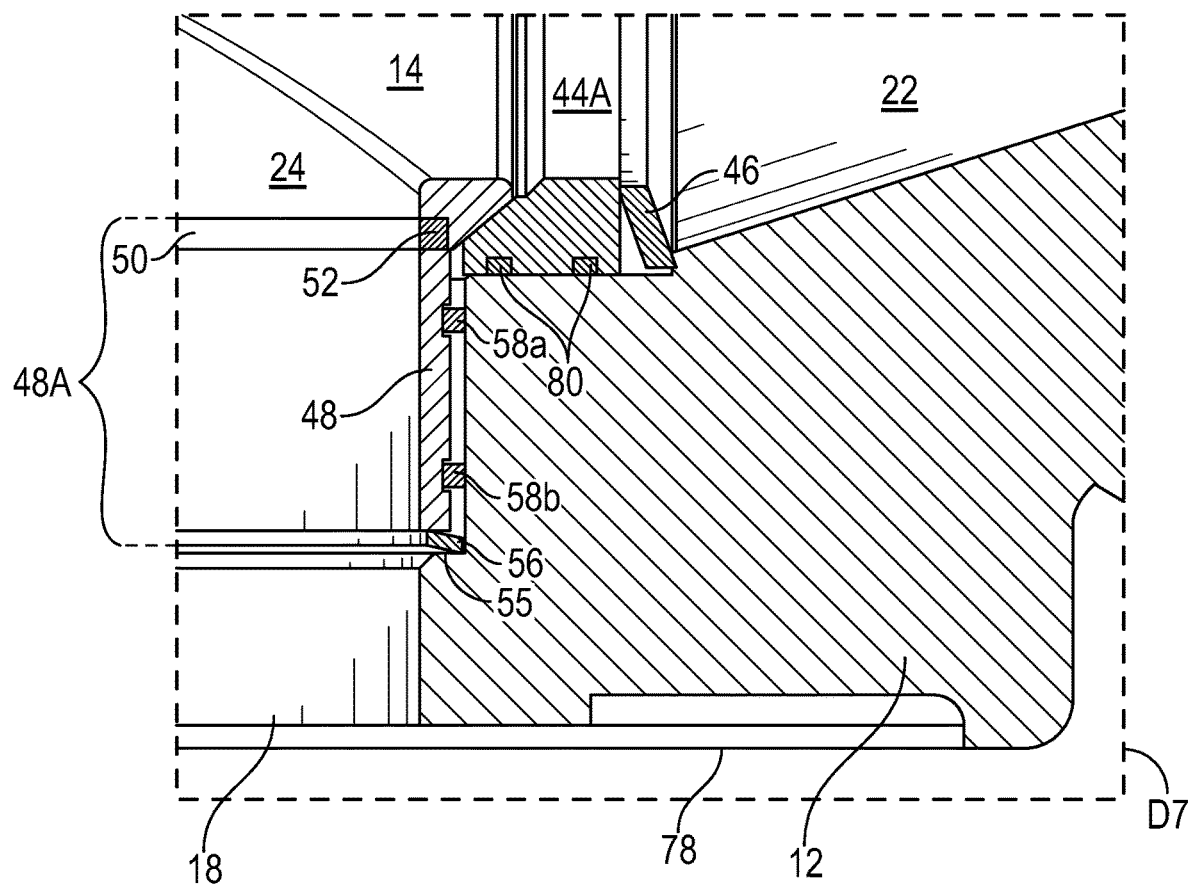
FIG. 7 is a side sectional view of the inlet sleeve detail D7 in the multiport valve of FIGS. 1-6.

As best seen in FIGS. 6 and 7, the ball 14 is supported on the bottom by a semi-trunnion sleeve assembly 48A at the inlet 24. The sleeve assembly 48A is comprised of sleeve 58, sleeve bearing 52 between the sleeve 48 and the ball 14, sleeve resilient member 56, such as a Belleville resilient member, between the sleeve 48 and the valve body 12, and sleeve seal rings 58 above and below the sleeve 48. The supporting sleeve assembly 48A engages a corresponding groove 50 disposed into the bottom of the ball 14 to allow sealing rotation of the ball 14 about central axis 20.

Figure 9:
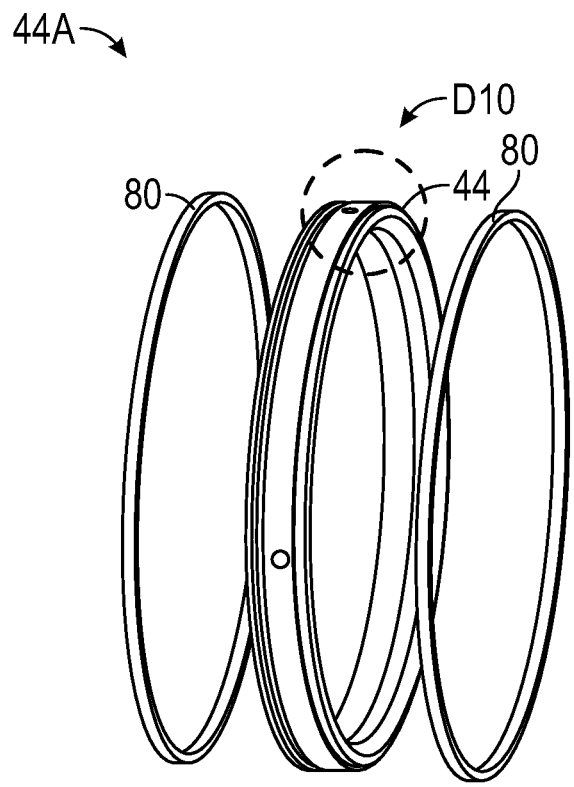
FIG. 9 is an exploded view of an outlet valve seat assembly in the multiport valve of FIGS. 1-8.
Figure 10:
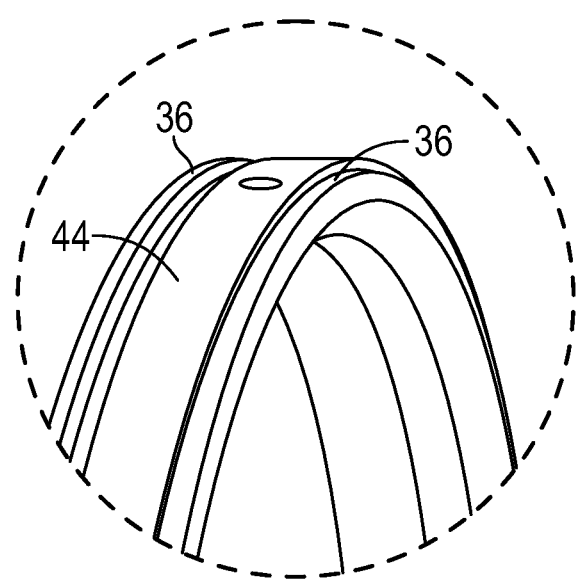
FIG. 10 is an enlarged view of the outlet valve seat assembly detail D10 of FIG. 9.
Figure 11:
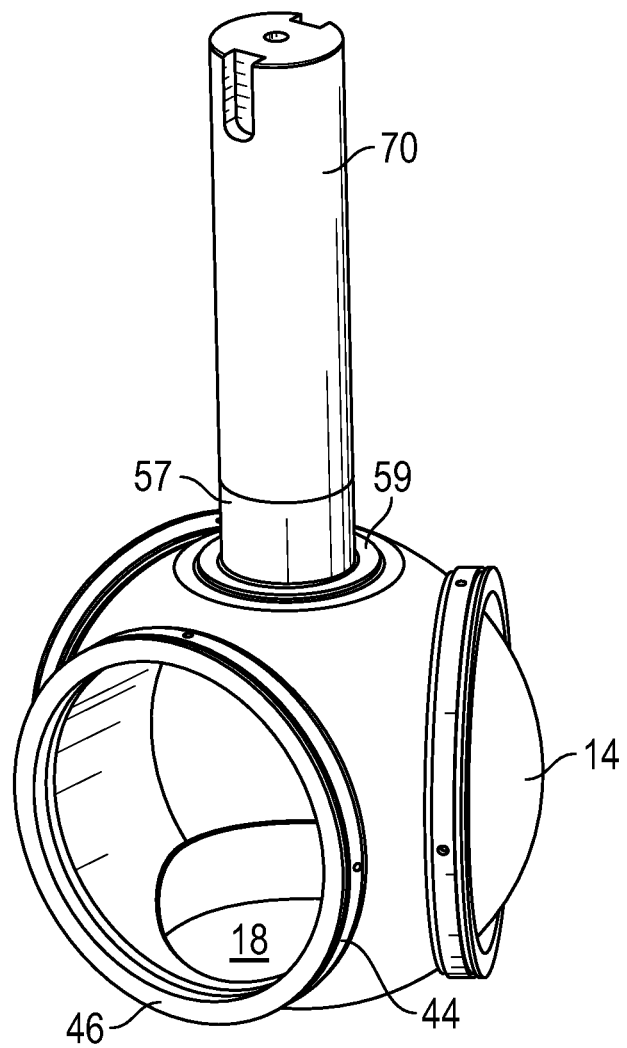
FIG. 11 is a cut away view of the flow control element engaged with the outlet valve seats in the multiport valve of FIGS. 1-10.

As seen in FIGS. 9 and 10, seat assemblies 44A comprise seals 80 disposed in grooves 36 of seat ring 44. As best seen in FIG. 11, the ball 14 is centered by the outlet seat assemblies 44A around each of the outlets 22a, 22b, 22c. Since the ball 14 is not floating and is supported mainly by the sleeve assembly 48A, the loading on the outlet seat assemblies 44A can be reduced, which in turn reduces the torque required to rotate the ball 14 during switching operations.

The main valve body 12 defines the fluid entry port 18 and flange 78 (FIGS. 2-3), most of the valve outlets 22, and the flanges 42, and a lower portion 60 of each of the outlet recesses 68 in which lower portions of the outlet valve seat assemblies 44A and retaining resilient members 46 are located. An upper portion 66 of the seat recesses 68 is formed in a lower portion of the bonnet 62. The bonnet 62 thus forms the upper recess portions 66 in which each outlet valve seat assembly 44A and a corresponding retaining resilient member 46 are located. The seat recesses 68 are bisected between the body 12 and the bonnet 62, which allows for removal of the bonnet 62 to expose and access the valve seat assemblies 44A and the corresponding resilient members 46.

Figure 12:
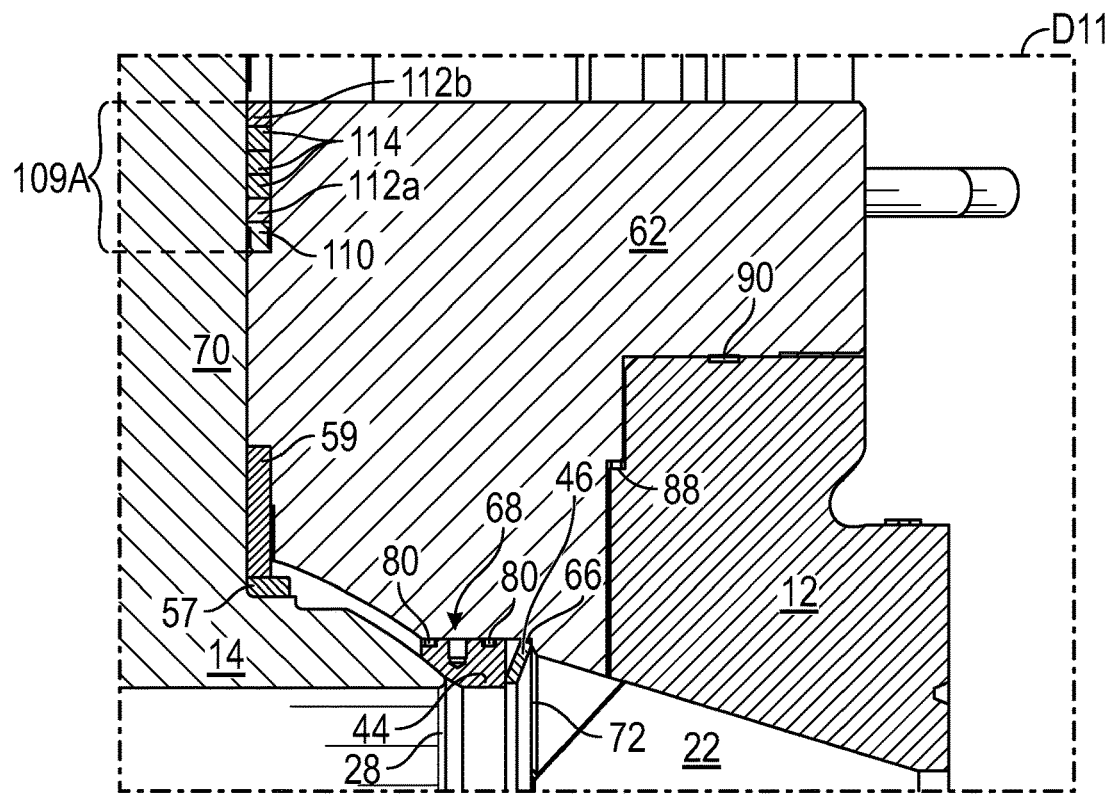
FIG. 12 is an enlarged view of detail D11 from FIG. 3.

FIG. 12 shows the enlarged detail D12 from FIG. 3 where the bonnet 62 is engaged with the main valve body 12, the valve stem 70, the valve seat assembly 44A and a corresponding resilient member 46. The bonnet 12 engages and biases the upper portion of the resilient member 46. The bonnet 62 has a chamfered surface 72 which engages the resilient member 46 to load the corresponding upper portion of the resilient member 46 against the outlet valve seat assembly 44A when the bonnet 62 is assembled to the main valve body 12.

Since they are not coupled to any seals, the end connections 78 and 42 can be connected to the process piping (not shown) before or after the assembly of the valve 10, as desired. To assemble the valve 10 and load the resilient members 46 and seat assemblies 44A, first the sleeve assembly 48A (see FIGS. 6-7) is installed on the shoulder 55 (FIG. 7) in the cavity 94 (FIG. 3) adjacent to the valve body inlet 18. Next, the ball 14 is lowered into the main valve body 12 to engage the sleeve groove 50 with the sleeve bearing 52 of the sleeve assembly 48A.

Figure 13:
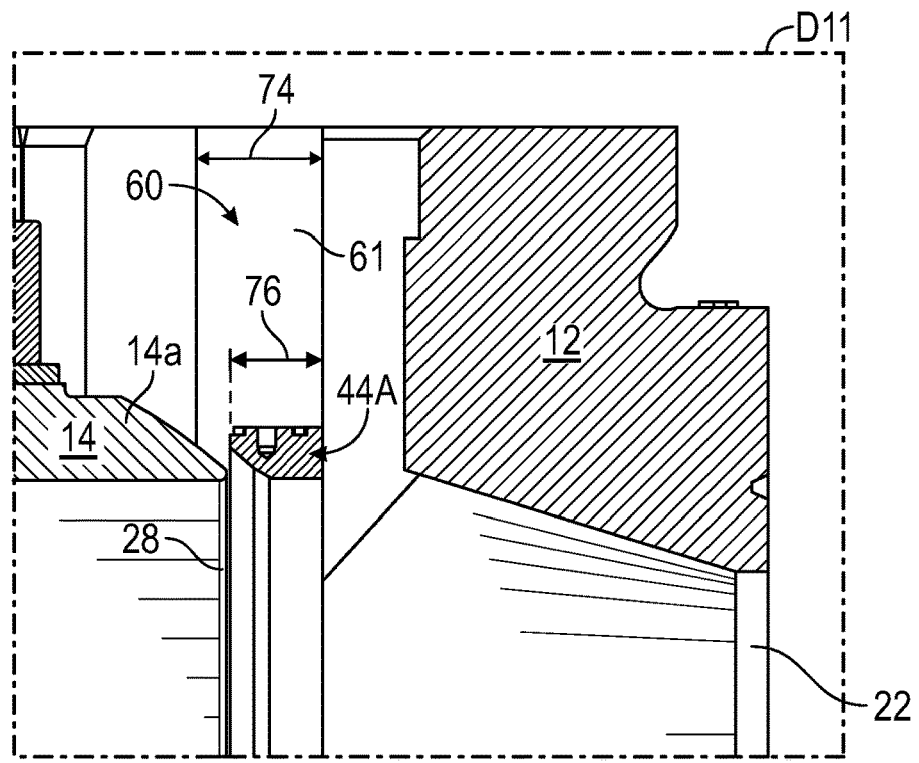
FIG. 13 shows detail D11 of FIGS. 3 and 12 with the bonnet removed and the outlet valve seat assembly in the seat recess in position for engagement with the flow control element during assembly of the multiport valve of FIGS. 1-12.
Figure 14:
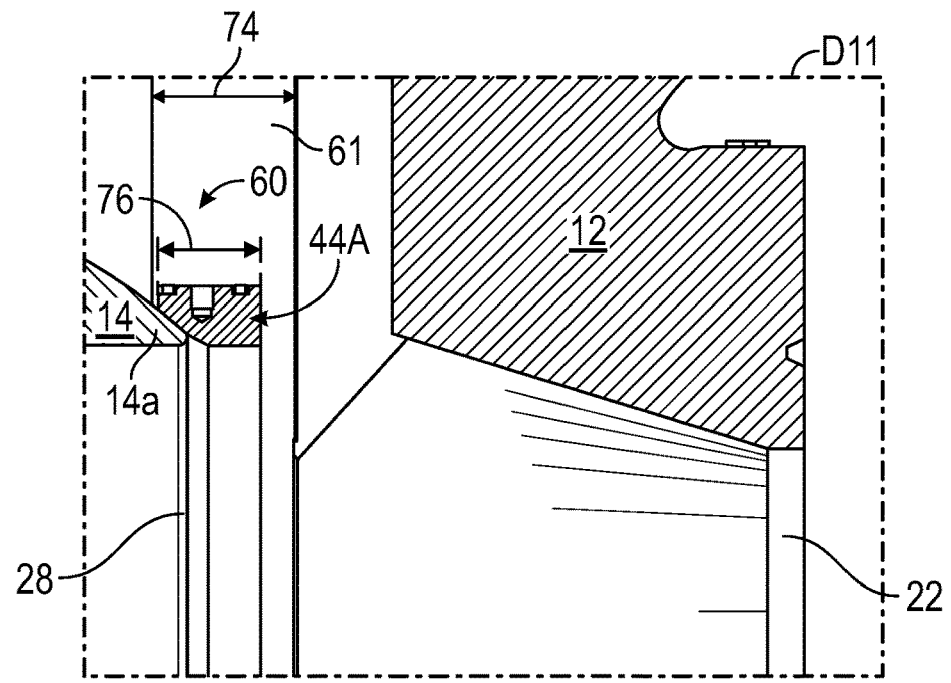
FIG. 14 shows detail D11 of FIGS. 3 and 12-13 with the bonnet removed and the outlet valve seat assembly engaging the flow control element and the seat recess ready to receive the resilient member during assembly of the multiport valve of FIGS. 1-13.
Figure 15:
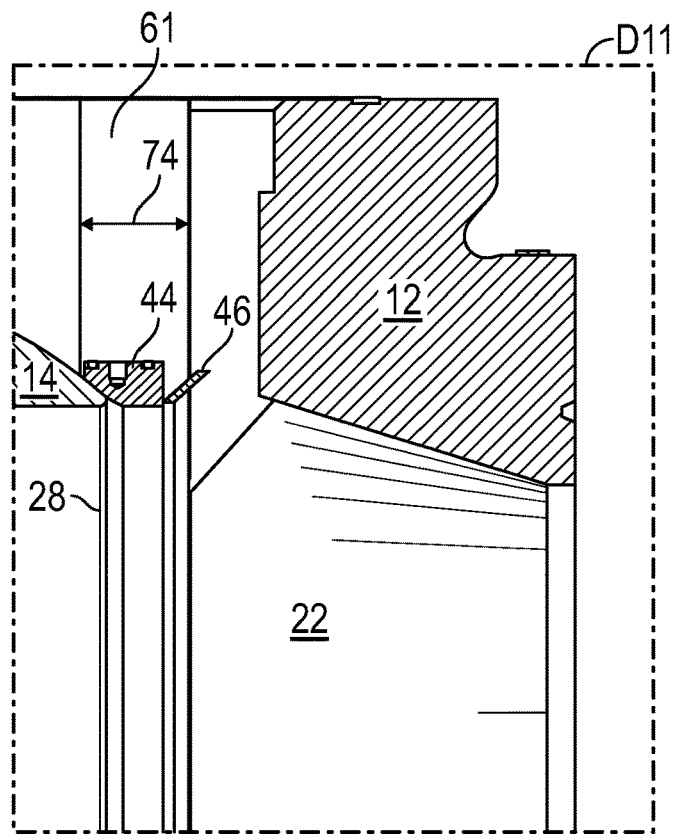
FIG. 15 shows detail D11 of FIGS. 3 and 12-14 with the outlet valve seat assembly engaging the flow control element and the resilient member installed in the seat recess ready to receive the bonnet during assembly of the multiport valve of FIGS. 1-14.

Then the ball 14 is turned to face one of the outlets 22a, 22b, 22c and the respective seat assembly 44A is inserted via alignment guideway recesses 61 into the corresponding seat recess lower portion 60 as shown in FIG. 13. It is seen that the dimension 74 of the recess 61 is greater than the width 76 of the seat assembly 44A and the nose portion 14a of the ball 14 residing therein. Then the seat assembly 44A is slid forward to engage the nose 14a of the ball 14 as seen in FIG. 14, and the resilient member 46 is inserted into the seat recess 60 as seen in FIG. 15.

At this point the lower portion of the resilient member 46 is biasing the seat assembly 44A against the ball 14, but the upper portion is unloaded. The ball 14 is then rotated to the other outlet positions 22 and the process is repeated until all of the seat assemblies 44A and resilient members 46 are positioned.

Stem thrust bearing 59 and bushing 57 are slid onto the stem 70, and bonnet seal 88 and gasket 90 are positioned. Finally, the bonnet 62 is positioned on the main valve body 12, e.g., by lining up alignment ribs 63 formed on bonnet 62 to engage alignment guideway recesses 61 formed in the main valve body 12 as a projection of the lower set recess portions 60. When the bonnet 62 is lowered into position on the main valve body 12, the chamfered surfaces 72 engage the respective resilient members 46 to load the corresponding upper portions of the resilient members 46 against the respective seat assemblies 44A. The bonnet 62 is then bolted to the main body 12 via studs 62a and bolts 62b.

Packing assembly 109A installation includes sliding lantern ring 110, anti-extrusion ring 112a, packing rings 114, and anti-extrusion ring 112b on the stem 70, as best seen in FIG. 12, and installation of gland studs 116, gland flange 118, live loading spring discs 120, and gland nuts 122. Then the top works 96 and actuator 108 are optionally installed.

Conversely, for disassembly (after removal of the top works 96, packing assembly 109A, bushing 57, thrust bearing 59, etc.), as shown in FIG. 15, removal of the bonnet 62 from the main body 12 unloads the upper portion of the resilient members 46. In turn, this allows for removal of the resilient member 46, e.g., using an S-hook (not shown), when the ball 14 is rotated to face one of the outlets 22. After the resilient member 46 is removed as shown in FIG. 14, the seat assembly 44A can be slid off of the ball 14 into the position shown in FIG. 13, and removed from the lower seat recess 60. The ball 14 can then be turned to remove the resilient members 46 and seat assemblies 44A from the other two outlet ports. Then the ball 14 and sleeve assembly 48A can be removed.

Figure 16:
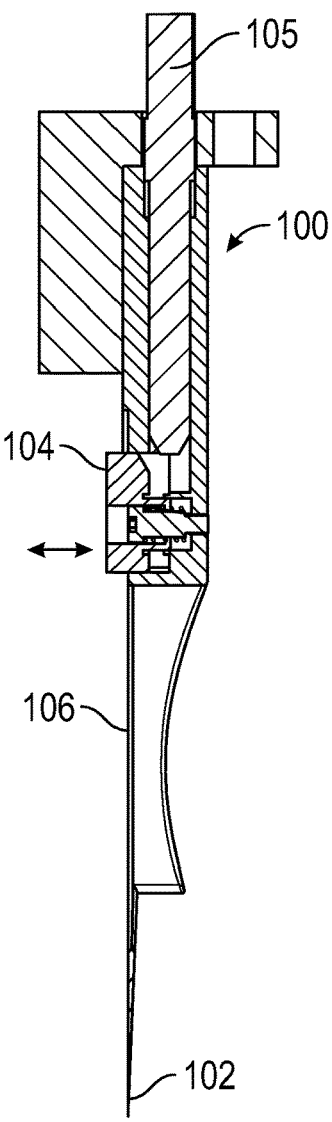
FIG. 16 shows a side sectional view of a resilient member removal tool according to embodiments of this invention.
Figure 17:
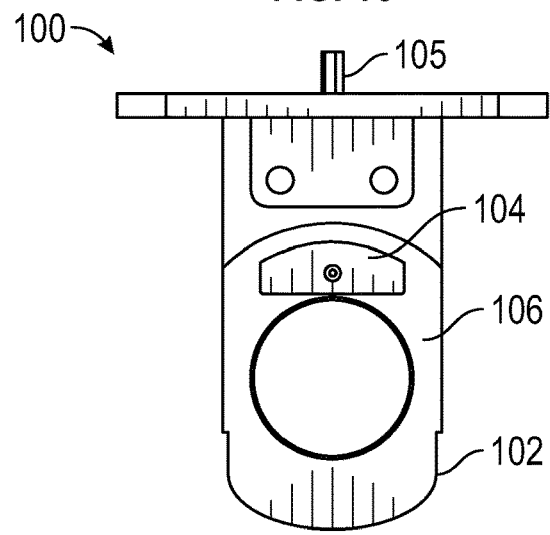
FIG. 17 shows a front view of the resilient member removal tool of FIG. 15.
Figure 18:
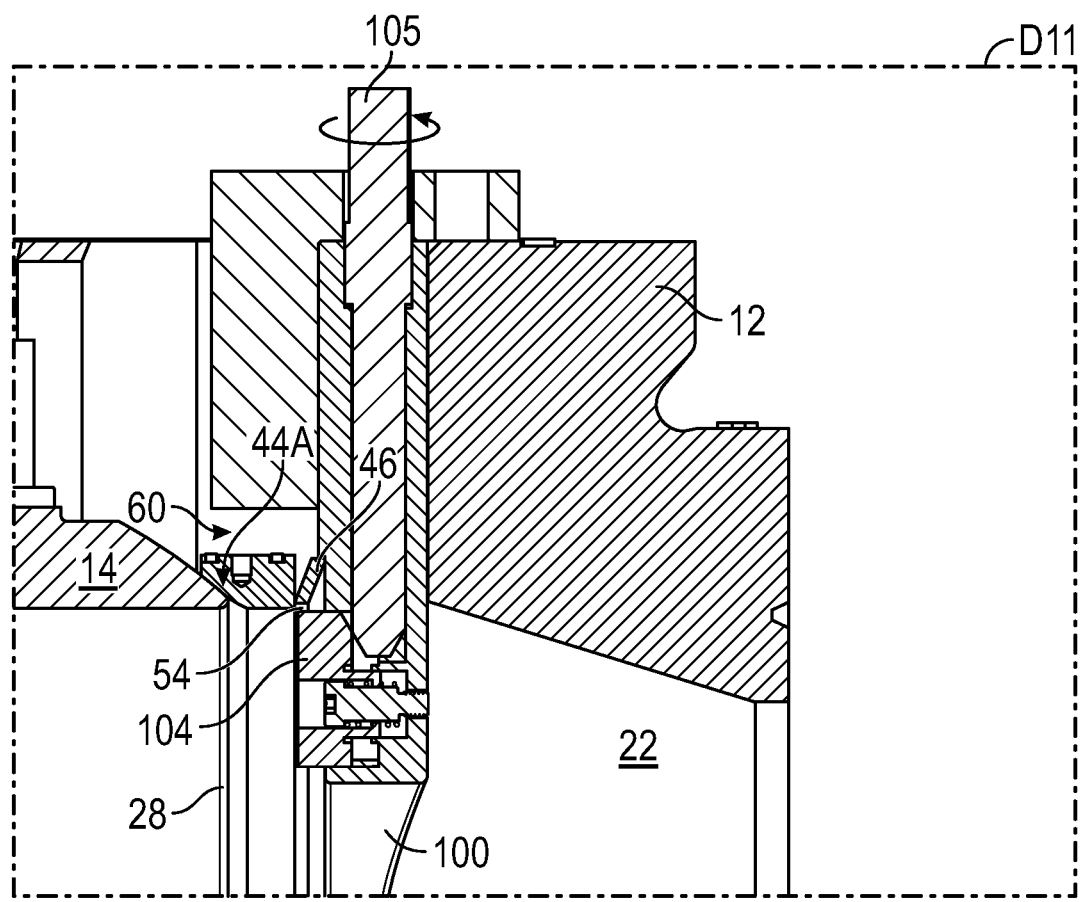
FIG. 18 shows detail D11 of FIG. 3 with the bonnet removed and the resilient member removal tool of FIGS. 16-17 engaged with a resilient member in preparation for removal according to embodiments of this invention.

If desired, a specially designed tool 100 as shown in FIGS. 16-18 can be used for removal of resilient members 46. The tool 100 has an appendage 102 which fits into the seat recess 68 between the valve body 12 and the resilient member 46. The tool 100 further includes a selectively retractable/extendable portion 104, which extends away from the face 106 of the tool to engage the resilient member 46 once the tool 100 is inserted into position. As shown in FIG. 18, the bonnet 62 is removed from the valve body 12. The outlet of the ball 14 is positioned to a valve outlet 22 and the resilient member removal tool 100 is inserted into the seat recess. The tool 100 is then actuated by rotating a threaded actuator 105 to extend the portion out from a face of the tool to engage the resilient member. The tool 100 is then withdrawn from the seat recess 68 together with the resilient member 46. If desired, the resilient member 46 may also be inserted using the tool 100 in a reverse manner.

The true top bonnet access of the instant valve 10 allows for the resilient members 46 and seat assemblies 44A to be inserted and removed exclusively from the top, and thus in the field or other operational environment without disconnecting the inlet and outlet piping from end connections 42, 78. Furthermore, servicing the valve 10 in this manner does not affect the loading on any connected process piping since the end connections 42, 78 are integral to the valve body 12 and independent of the loading on the seat assemblies 44A and sleeve assembly 48A.

Figure 4:
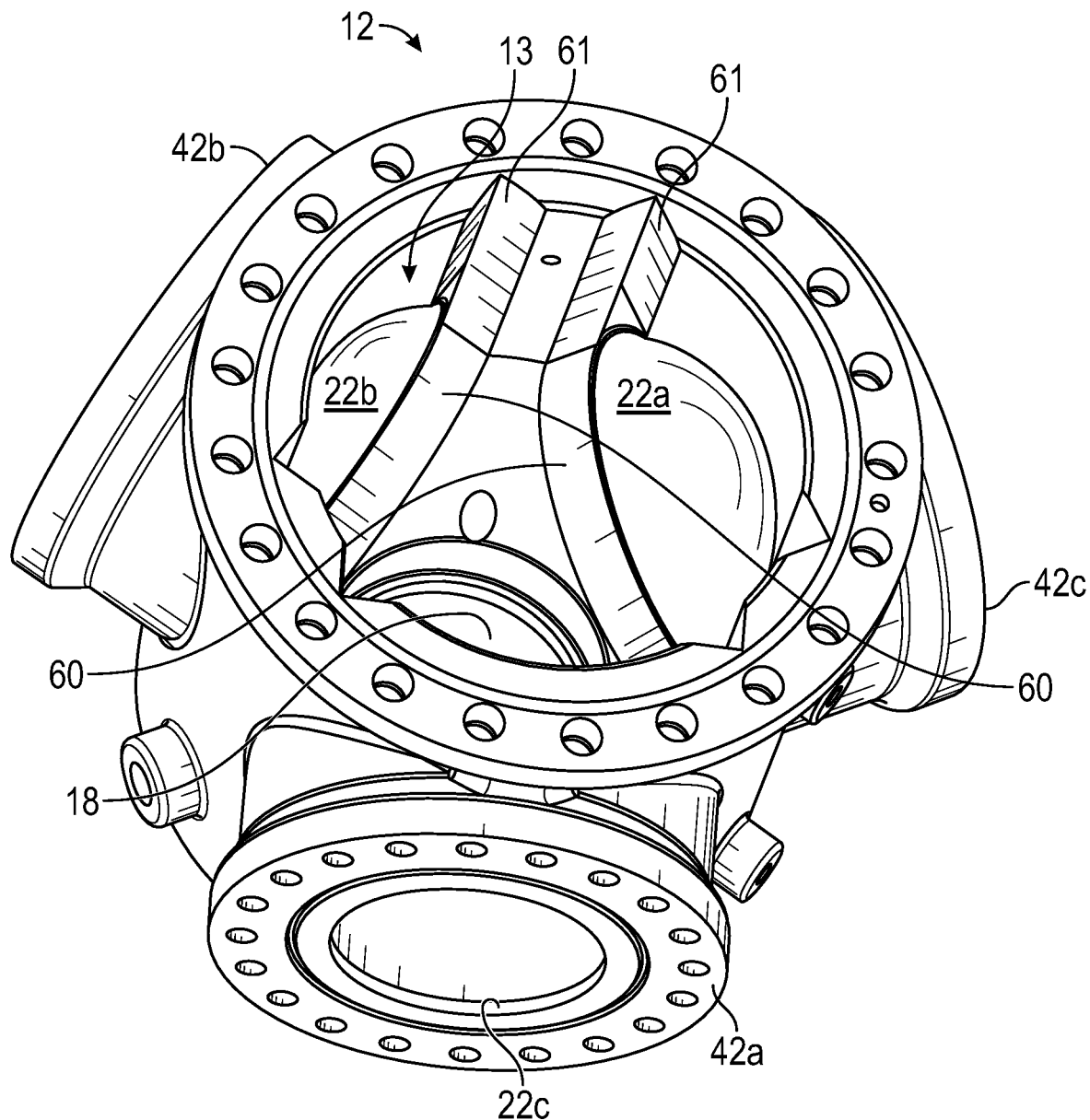
FIG. 4 is a perspective view of the main body in the multiport valve of FIGS. 1-3.

The bisecting of the valve seat recesses between the main body and the bonnet also allows for a reduction in open space in the body cavity 94 between the inside surfaces of the body 12 and the opposing outside surfaces of the ball 14 (cf. FIGS. 4 and 12). The reduced annular volume 94 in this arrangement limits the amount of debris that can accumulate and improves the purge efficiency (higher space velocity). The maximum open space in the valve cavity between the inside surfaces of the body and the opposing outside surfaces of the ball is preferably less than 1 cm.

One problem prior art CSVs have had is that during switching of the valve the fluid flow may be temporarily restricted, or hiccup, by pinching the flow down by as much as 40% during the switching operation. The change in flow rate causes problems in the upstream heaters that results in hot spots, that can result in damaged equipment, plugged systems, and stuck valves. In the present valve 10, the outlet flow passages 22 formed in the CSV body 12 can have a frustoconical taper from an enlarged cross-sectional area corresponding to the inside diameter 38 of the ball outlet bore 28, back down to the cross-sectional area corresponding to the inside diameter 40 of the area of the ball inlet bore 24, which often matches the ID of the body inlet 18, sleeve assembly 48A, and ball inlet 24. In embodiments, the relative flow area of the ball inlet 24 to the outlet 28 is from 1:1.5 to 1:500, preferably at least 1:1.5, and more preferably at least 1:1.65. For example, if the ID of the inlet sleeve 48 is 30 cm (area=707 cm$^2$), then the outlet bore 28 of the ball preferably has an area of at least 1060 cm$^2$, more preferably at least 1166 cm$^2$, corresponding to an ID of preferably at least 36.7 cm, more preferably at least 38.5 cm.

Due to the enlarged internal flow passages that result, switching of the valve 10 from one outlet 22 to another does not result in a substantial change in flow rate through the valve 10, e.g., a minimum Cv during switching can be about 80%, preferably 90-100% of the Cv during normal operation, or in other words the flow immediately before and after switching can be maintained at preferably at least 80%, more preferably 90-100%. Thus, the present valve 10 can reduce or eliminate the formation of hot spots in the heaters, and it is not necessary to reduce the firing rate of the associated heater and/or reduce the flow rate in anticipation of the switching operation.

Figure 19:
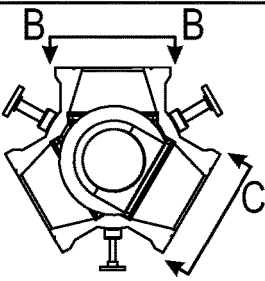
FIG. 19 is a chart showing the position of the flow control element and the body outlet areas along view lines B-B and C-C as the ball is rotated counterclockwise from the C position (bypass) to the B position.
Figure 19:
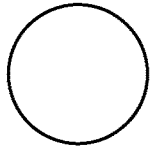
Figure 19:
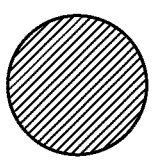
Figure 19:
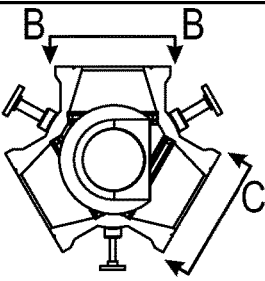
Figure 19:
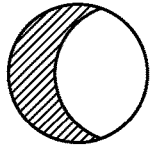
Figure 19:
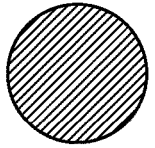
Figure 19:
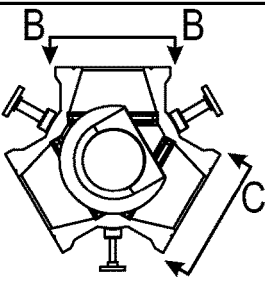
Figure 19:
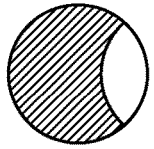
Figure 19:
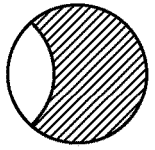
Figure 19:
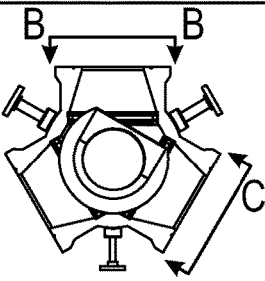
Figure 19:
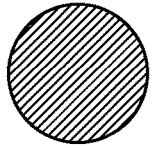
Figure 19:
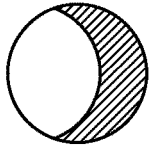
Figure 19:
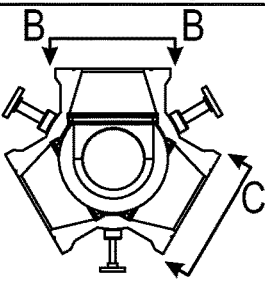
Figure 19:
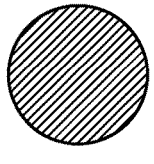
Figure 19:
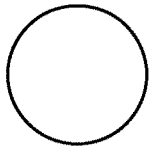

Due to the larger outlet flow area from the ball 14 in the present valve 10, the outlet passages 22 and 28 overlap considerably as the valve is switched one position to another. As shown in FIG. 19, the view lines C-C shown in the second column are an end view of the ball 14 as seen in the outlet 22*c* (bypass), and the B-B view lines as seen from the outlet 22*b* (drum B), as the ball is rotated from communication with outlet 22*c* to communication with outlet 22*b*. Through the first approximately 30 degrees, the flow area to outlet 22*a* begins to reduce, but there is no communication to the 22*b* outlet. Continued rotation from about 30 degrees provides communication to both 22*a*, which is decreasing, and to 22*b* which is increasing. At about 90 degrees of rotation, the 22*a* outlet is closed off entirely and the flow is entirely into outlet 22*b*. Further rotation to 120 degrees provides 100% coincidence with outlet 22*b*. Switching between other outlets 22 is similar.

In the present valve 10, there is a reduced purge fluid consumption, improved purge efficiency, and the purge system and purging can also be simplified. The purge fluid is preferably steam, which is referred to herein by way of example. Reduction of steam consumption is an important consideration for CSVs because purge steam is recovered from the process media as sour water, which requires costly treatment. By eliminating the bellows springs that need continuous purging, and by providing the inlet-sealing sleeve assembly 48A, steam purge can be limited to just a few body steam purge inlets 142*a*, 142*b*, 142*c* and a stem purge 144. Rather than continuously purging into the process media via the unsealed inlet area as in the prior art, the present valve 10 uses purge drains 146*a*, 146*b*, which need only be opened to flush out the body cavity 94 before and/or after a switching operation. Reduced annular volume 94 improves efficiency. The system can be further simplified by using just two manifolds 140*a*, 140*b* to supply the purge steam, as best seen in FIGS. 2-3.

The body cavity 94 is isolated from the process media by the inlet sleeve assembly 48A and seals 58*a*, 58*b*, and seat assemblies 44A. Although purge steam is continuously supplied between switching operations, preferably at a higher pressure than the process media, the steam consumption between switching operations is minimal, because it is limited to incidental leakage through the inlet sleeve assembly 48A and seat assemblies 44A.

High steam consumption occurs only during switching when the process media can communicate to the body cavity 94 and/or when the purge drains 146*a*, 146*b* are open. Preferably, the drains 146*a*, 146*b* are opened to purge the body cavity 94 before and after each switching operation. Thus, the drains 146*a*, 146*b* are opened prior to a switching operation, then closed during the switching operation while steam purges into the process media, subsequently opened after completion of the switching operation to remove any process media that might have accumulated in the body cavity 94, and then closed until another switching operation procedure is initiated. Moreover, due to the relatively smaller body cavity 94 volume relative to prior art CSVs, any accumulation of process media is limited.

EMBODIMENTS

Accordingly, the invention described herein provides the following embodiments:

1. A multiport valve, comprising:
   a valve body comprising a flow path between a body inlet coaxial to a first axis and a plurality of body outlets each oriented at an angle transverse to the first axis;
   a spherical flow control element disposed within a cavity;
   wherein the flow control element comprises a ball inlet having a ball inlet area radially arranged about the first axis, and a ball outlet having a ball outlet area larger than the ball inlet area, radially arranged at the transverse angle to the first axis, the flow control element rotatable about the first axis to selectively align the ball outlet with each of the plurality of body outlets separately and to overlap the ball outlet with portions of two of the body outlets; and
   wherein the body outlets have a cross-sectional flow area tapering down from adjacent to the flow control element to an end connection.

2. The valve of embodiment 1, further comprising:
   a like plurality of outlet valve seat assembly recesses, each valve seat recess radially arranged about a respective one of the body outlets, each valve seat recess receiving a respective outlet valve seat assembly in sealing engagement between the valve body and the flow control element;
   a like plurality of resilient members, each biased between the valve body and a respective one of the outlet valve seat assemblies; and
   an inlet sleeve assembly radially arranged about the body inlet in sealing, biased engagement between the valve body and the flow control element.

3. The valve of embodiment 2, further comprising:
   wherein the valve body comprises a lower main body sealingly engaged with an upper bonnet;
   wherein the body inlet is disposed through the main body;
   wherein a portion of each body outlet is formed through the main body and a remaining portion of each body outlet is formed by the bonnet;
   wherein a lower portion of each outlet seat recess is formed into the main body, whereby a corresponding lower portion of each resilient member is biased against the main body;
   wherein an upper portion of each outlet seat recess is formed into the bonnet, whereby a corresponding upper portion of each resilient member is biased against the bonnet.

4. The valve of embodiment 3, wherein the flow control element, the outlet valve seat assemblies, the resilient members, the inlet sleeve assembly, and the outlet seat recesses are dimensioned and arranged to allow sequential removal of the resilient members, disengagement of the outlet valve seat assemblies from the flow control element, removal of the outlet valve seat assemblies, removal of the flow control element, and removal of the inlet sleeve assembly from the valve body exclusively through an opening created by disengagement of the bonnet from the main valve body; and/or wherein the flow control element, the outlet valve seat assemblies, the resilient members, the inlet sleeve assembly, and the outlet seat recesses are dimensioned and arranged to allow sequential insertion of the inlet sleeve assembly into the valve body, insertion of the flow control element into the valve body, insertion of the outlet valve seat assemblies and engagement with the flow control element, the insertion of the resilient members into the outlet seat recesses, exclusively through the opening created by disengagement of the bonnet from the valve body.

5. The valve of any of embodiments 1 to 4, wherein the cross-sectional flow area of the body outlets matches the ball outlet area adjacent to the flow control element and matches the ball inlet area at the end connections.

6. A multiport valve, comprising:
a valve body comprising a body inlet coaxial to a first axis and a plurality of body outlets each oriented at an angle transverse to the first axis;
a spherical flow control element disposed within a cavity of the valve body comprising a ball inlet having a ball inlet area radially arranged about the first axis, and a ball outlet radially arranged at the transverse angle to the first axis, the flow control element rotatable about the first axis to selectively align the ball outlet with each of the plurality of body outlets separately;
a like plurality of outlet seat recesses, each outlet seat recess radially arranged about a respective one of the body outlets, each outlet seat recess receiving a respective outlet valve seat assembly in sealing engagement between the valve body and the flow control element;
 a like plurality of resilient members, each biasing a respective one of the outlet valve seat assemblies against the valve body;
an inlet sleeve assembly radially arranged about the body inlet in sealing, biased engagement between the valve body and the flow control element;
wherein the valve body comprises a lower main body sealingly engaged with an upper bonnet;
wherein a lower portion of each outlet seat recess is formed into the main body, whereby a corresponding lower portion of each resilient member is biased against the main body; and
wherein an upper portion of each outlet seat recess is formed into the bonnet, whereby a corresponding upper portion of each resilient member is biased against the bonnet.

7. The valve of embodiment 6, wherein the main body comprises U-shaped recesses defining the lower portions of the outlet seat recesses and alignment guideways to receive respective alignment ribs of the bonnet.

8. The valve of embodiment 6 or embodiment 7, further comprising a valve stem extending from the flow control element through an opening through the bonnet, whereby the flow control element can be rotated by rotating the stem to switch alignment of the ball outlet with a selected one of the body outlets.

9. The valve of embodiment 8, further comprising a stem thrust bearing and a bushing oriented about the stem in rotational contact between a surface disposed into the spherical flow control element and a corresponding surface disposed into the bonnet radially about the valve stem opening.

10. The valve of any of embodiments 6 to 9, wherein the inlet sleeve assembly comprises:
a sleeve member;
a sleeve resilient member biased between the main body and a lower end of the sleeve member;
a sleeve bearing disposed between an upper end of the sleeve member and a circular groove formed in a lower end of the flow control element; and
one or more seal rings disposed between the sleeve member, the flow control element, and/or the main body.

11. The valve of any of embodiments 6 to 10, further comprising respective biasing portions formed in the upper portions of the outlet valve seat assembly recesses arranged to engage the respective resilient members.

12. The valve of any of embodiments 6 to 11, wherein the outlet valve seat assemblies respectively comprise one or more seals in sealing contact between a seat ring and the outlet seat recess, preferably wherein the one or more seals are disposed within respective grooves disposed into an outer surface of the seat ring.

13. The valve of any of embodiments 6 to 12, further comprising a purge inlet to the cavity between the valve body and the and flow control element, and a drain to remove purge fluid from the cavity between the body and the flow control element.

14. The valve of any of embodiments 6 to 13, wherein an area of the ball outlet is larger than an area of the ball inlet, preferably at least 50% larger, more preferably at least 65% larger.

15. The valve of embodiment 14, wherein the body outlets have a cross-sectional flow area tapering down from adjacent to the flow control element to an end connection.

16. The valve of embodiment 15, wherein the cross-sectional flow area of the body outlets matches the ball outlet area adjacent to the flow control element and matches the ball inlet area at the end connections.

17. The valve of any of embodiments 6 to 16, wherein, and the flow control element is rotatable to overlap the ball outlet with portions of two of the body outlets.

18. A method of operating a coker switch valve, comprising:
(a) providing the multiport valve of any of embodiments 1 to 17;
(b) continuously supplying steam to a plurality of steam purge inlets to the body cavity;
(c) rotating the flow control element to switch alignment of the ball outlet from one of the body outlets to another one of the body outlets while maintaining the steam supply;
(d) continuously flowing process media through the valve while rotating the flow control element; and
(e) draining steam and process media from the cavity after the alignment switching.

19. The method of embodiment 18, wherein the process media flow in step (d) is maintained at a substantially constant rate immediately before, during, and immediately after the alignment switching, preferably wherein the switching maintains from 90 to 100 percent of the process media flow relative to the process media flow immediately before and immediately after the switching.

20. The method of embodiment 18 or embodiment 19, wherein a volume of the steam flow to the purge inlets other than during switching in step (c) is limited to incidental leakage into process media.

21. A method to assemble the valve of any of embodiments 1 to 16, comprising the sequential steps of:
(a) inserting the inlet sleeve assembly into engagement with the main body about the body inlet;
(b) inserting the flow control element into the main body to engage the inlet sleeve assembly;
(c) inserting each of the outlet valve seat assemblies and resilient members into the lower portion of the outlet seat recesses, wherein each insertion comprises:
(i) orienting the ball outlet towards one of the body outlets;

(ii) inserting one of the outlet seat assemblies into the lower portion of the respective outlet seat recess;
(iii) sliding the respective outlet seat assembly into engagement with the flow control element; and
(iii) inserting one of the resilient members into the lower portion of the respective outlet seat recess to bias a respective lower portion of the outlet seat assembly against the flow control element; and
(d) engaging the bonnet with the main body to bias the upper portions of the resilient members against respective upper portions of the outlet seat assemblies.

22. The method of embodiment 21, further comprising aligning alignment ribs of the bonnet with alignment guideways formed in the main body, wherein the alignment guideways and the lower portions of the outlet seat recesses define a U shape.

23. The method of embodiment 21 or embodiment 22, further comprising inserting a valve stem extending from the flow control element through an opening through the bonnet.

24. The method of any of embodiments 21 to 23, further comprising connecting the valve to process piping via flanged end connections integral to the valve body, wherein the end connections are uncoupled from the outlet valve seat assemblies.

25. A method of servicing the valve of any of embodiments 1 to 17, comprising:
(a) removing the bonnet from the main body;
(b) removing each of the outlet valve seat assemblies and resilient members from the main body, wherein the removal comprises:
orienting the ball outlet towards one of the body outlets;
(ii) removing the respective resilient member from the lower portion of the respective outlet seat recess;
(iii) disengaging the respective outlet seat assembly from the flow control element; and
(iv) removing the respective outlet seat assembly from the lower portion of the respective outlet seat recess;
(c) removing the flow control element from the main body; and
(d) removing the inlet sleeve assembly from the main body.

26. The method of embodiment 25, wherein the removal steps (a) to (d) are conducted in-line while the valve remains attached to process piping at end connections at the body inlet and at one or more body outlets.

27. The method of embodiment 25 or embodiment 26, wherein the removing of the resilient member from the main body comprises:
(I) providing a resilient member removal tool comprising a bottom appendage dimensioned to fit into the lower portion of the outlet seat recess between the main body and the resilient member, and a selectively retractable/extendable portion dimensioned to extend away from a face of the tool to engage an inner edge of the resilient member after the tool is inserted into position between the resilient member and the main body;
(II) inserting the bottom appendage of the resilient member removal tool into the U-shaped recess between the resilient member and the main body until the extendable portion of the resilient member removal tool is positioned to engage the inner edge of a corresponding resilient member;
(III) actuating the tool to extend the extendable portion towards the center of the valve away from the face of tool in an amount sufficient to engage the inner edge of the resilient member, and (IV) removing the tool from the U-shaped recess together with the resilient member.

28. The method of embodiment 25, wherein the flow control element is rotatable to overlap the ball outlet with portions of two of the body outlets.

Example

A 30 cm, 41.4 bar (12" 600 #) delayed coker switching valve was constructed according to FIGS. 1-19 and extensively tested to validate the valve design features and concepts described herein. The ratio of the ball outlet bore diameter 38 to the ball inlet bore diameter 40 was 1.3.

Heat Cycle Test: heat was applied inside the valve until the temperature reached 650° F. The valve was stroked to all three port positions and the torque recorded. The testing was repeated at temperatures of 399° C. (750° F.), 454° C. (850° F.), and 493° C. (920° F.). The testing validated the thermal clearances and high temperature functionality of the valve at these operating temperatures.

Lock-Up Test: the body cavity was filled with hot tar-like media. The valve was left to cool for two days, and then stroked manually. The valve was left to cool for another week, and then stroked with a motor. The valve was then disassembled for inspection. The results of the lock-up testing indicated the valve would most likely continue to function during a steam purge loss and that the valve is repairable after a coking incident.

Seat Leakage Test: the valve reached class IV shutoff specifications.

Purge and Drain Flow Test: fluorescent particles were injected to the purge ports using a collision nebulizer. The particles were used to trace the purge flow path and insure full coverage to validate CFD simulation. Different colors were used to identify functionality of each port. The tracing particles were visible under UV light and fully covered the valve internals.

Process Flow Test: the valve is tested for flowing heavy hydrocarbon. During switching the valve has a Cv that is 80-90% of the Cv during normal operating conditions.

These data show the 4-way switch valve according to the instant disclosure is suitable to handle asphalt-like materials at high temperature.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A multiport valve, comprising:
a valve body comprising a body inlet coaxial to a first axis and a plurality of body outlets each oriented at an angle transverse to the first axis;
a spherical flow control element disposed within a cavity of the valve body;
a sleeve assembly radially arranged about the body inlet and engaging a corresponding groove disposed into a bottom of the spherical flow control element to support the spherical flow control element;

respective seats and resilient members received in outlet seat recesses formed about each body outlet, wherein the valve body comprises a lower main valve body sealingly engaged with a removeable upper bonnet;

a lower part of each outlet seat recess formed in the lower main valve body;

an upper part of each outlet seat recess formed in the upper bonnet;

wherein the upper bonnet and the lower main valve body together bias the resilient members to load the seats, maintaining alignment of the spherical flow control element and equalizing stresses, independently of end connection loads.

2. The multiport valve of claim 1, wherein the resilient members comprise a Belleville resilient member.

3. The multiport valve of claim 1, wherein the spherical flow control element comprises a fluid flow passages from the ball inlet to a ball outlet, wherein the spherical flow control element is rotatable about an axis of the ball inlet to selectively align the ball outlet with each of the plurality of body outlets, wherein the ball outlet has a larger cross-sectional flow area than the ball inlet.

4. The multiport valve of claim 1, wherein a ball outlet has an area at least 50% larger than the ball inlet.

5. The multiport valve of claim 4, wherein the body outlets have cross-sectional flow areas tapering down from adjacent to the flow control element respective end connections.

6. The multiport valve of claim 5, wherein the cross-sectional flow areas of the body outlets match the ball outlet area adjacent to the flow control element and match the ball inlet areas at the end connections.

7. The multiport valve of claim 1, wherein following removal of the upper bonnet and the resilient members, there is sufficient space in the respective seat recesses to remove the respective seat.

8. A method of operating a coker switch valve, comprising the steps of:
  (a) providing a coker switch valve comprising a valve body comprising a body inlet coaxial to a first axis and a plurality of body outlets each oriented at an angle transverse to the first axis, wherein a flow control element received in a cavity of the valve body has a ball inlet radially arranged about the first axis, a ball outlet radially arranged about the transverse angle, and is rotatable about the first axis to selectively align the ball outlet with each of the plurality of body outlets separately, wherein the ball outlet has a ball outlet area larger than a ball inlet area of the ball inlet;
  (b) aligning the ball outlet with a first one of the body outlets for supply of process media exclusively through the valve body inlet, the ball inlet, the ball outlet and the first body outlet;
  (c) rotating the flow control element to overlap the ball outlet with portions of the first and a second one of the body outlets for supply of process media exclusively through the valve body inlet, the ball inlet, the ball outlet and the first and second body outlets; and
  (d) aligning the ball outlet with the second valve body outlet for supply of process media exclusively through the valve body inlet, the ball inlet, the ball outlet and the second valve body outlet.

9. The method of claim 8, wherein the ball outlet area is at least 50% larger than the ball inlet area.

10. The method of claim 8, further comprising the steps of:
  (1) continuously supplying steam to a plurality of steam purge inlets to a cavity of the valve body;
  (2) rotating the flow control element to switch alignment of the ball outlet from the first body outlet to the second body outlet while maintaining the steam supply;
  (3) continuously flowing process media through the coker switch valve while rotating the flow control element in step (2); and
  (4) draining steam and process media from the cavity after the alignment switching in step (2).

11. The method of claim 10, wherein the process media flow in step (3) is maintained at a substantially constant rate immediately before, during, and immediately after the alignment switching in step (2).

12. The method of claim 11, wherein a volume of the steam flow to the steam purge inlets other than during alignment switching in step (2) is limited to incidental leakage into process media.

13. The method of claim 10, wherein the process media flow during the alignment switching in step (3) is maintained at a rate not less than 80% of the process media flow immediately before and immediately after the alignment switching.

14. A method to assemble a coker switch valve, comprising the sequential steps of:
  (a) inserting an inlet sleeve assembly into engagement with a main valve body about a valve body inlet, a lower part of a plurality of outlet seat recesses formed in the main valve body;
  (b) inserting a flow control element into the main valve body to engage the inlet sleeve assembly, the flow control element comprising a ball inlet and a ball outlet larger than the ball inlet;
  (c) inserting respective ones of outlet valve seat assemblies and resilient members into the respective lower part of the outlet seat recesses; and
  (d) engaging a bonnet with the main valve body, wherein an upper part of the plurality of outlet seat recesses is formed in the bonnet, wherein the bonnet biases the upper portions of the resilient members against the respective upper portions of the outlet valve seat assemblies.

15. The method of claim 14, wherein each insertion in step (c) comprises:
  (i) orienting the ball outlet towards one of the body outlets;
  (ii) inserting one of the outlet valve seat assemblies into the lower part of the respective outlet seat recess;
  (iii) sliding the respective outlet valve seat assembly into engagement with the flow control element; and
  (iv) inserting one of the resilient members into the lower part of the respective outlet seat recess to bias a respective lower portion of the outlet seat assembly against the flow control element; and
  (v) repeating steps (i) to (iv) for each additional body outlet.

16. The method of claim 15, further comprising aligning alignment ribs of the bonnet with alignment guideways formed in the main valve body, wherein the alignment guideways and the lower portions of the outlet seat recesses define a U shape.

17. The method of claim 15, further comprising inserting a valve stem extending from the flow control element through an opening through the bonnet.

18. The method of claim 15, further comprising connecting the valve to process piping via flanged end connections integral to the valve body, wherein the end connections are uncoupled from the outlet valve seat assemblies.

19. A method of servicing a coker switch valve, comprising:
(a) removing an upper bonnet from a lower main valve body of a multiport valve, the multiport valve comprising: a valve body comprising a body inlet coaxial to a first axis and a plurality of body outlets each oriented at an angle transverse to the first axis; a spherical flow control element disposed within a cavity of the valve body; and a respective outlet seat recess formed about each body outlet adjacent the flow control element, the outlet seat recesses receiving respective resilient members disposed between the valve NX and outlet valve seat assemblies, wherein the outlet valve seat assemblies are disposed between the resilient members and the flow control element, wherein the valve body comprises the lower main valve body sealingly engageable with the upper bonnet, wherein a lower part of each outlet seat recess is formed in the lower main valve body and an upper part of the outlet seat recess is formed in the upper bonnet wherein removing the upper bonnet disengages the upper part of the outlet seat recess from the outlet valve seat assemblies and resilient members;
(b) removing the resilient members and outlet valve seat assemblies and from the lower part of each outlet seat recess in the lower main valve body, wherein the removal comprises:
    (i) orienting a ball outlet of the flow control element towards one of the body outlets;
    (ii) removing the respective resilient member from the lower part of the respective outlet seat recess;
    (iii) then disengaging the respective outlet valve seat assembly from the spherical flow control dement and removing the respective outlet valve seat assembly from the lower part of the outlet seat recess; and
    (iv) repeating steps (i) to (iii) for each additional body outlet; and
(c) removing the spherical flow control element from the lower main valve body.

20. The method of claim 19, wherein the removal steps (a) to (c) are conducted in-line while the multiport valve remains attached to process piping at end connections at the body inlet and at one or more of the body outlets.

21. The method of claim 19, wherein the removing of the resilient member from the lower main valve body comprises:
(I) providing a resilient member removal tool comprising a bottom appendage dimensioned to fit into the lower part of the outlet seat recess between the lower main valve body and the resilient member, and a selectively retractable/extendable portion dimensioned to extend away from a face of the tool to engage an inner edge of the resilient member after the tool is inserted into position between the resilient member and the lower main valve body;
(II) inserting the bottom appendage of the resilient member removal tool into the lower part of the outlet seat recess between the resilient member and the lower main valve body until the retractable/extendable portion of the resilient member removal tool is positioned to engage an inner edge of the resilient member upon extension;
(III) actuating the resilient member removal tool to extend the retractable/extendable portion towards the spherical flow control element away from the face of the tool in an amount sufficient to engage the inner edge of the resilient member, and
(IV) removing the tool from lower part of the outlet seat recess together with the resilient member.

22. The method of claim 19, further comprising removing an inlet sleeve assembly from the lower main valve body.

23. A tool for removal of a resilient member from a coker switch valve comprising (1) a valve body comprising a body inlet coaxial to a first axis and a plurality of body outlets each oriented at an angle transverse to the first axis; (2) a spherical flow control element disposed within a cavity of the valve body and supported by a sleeve assembly radially arranged about the body inlet and engaging a corresponding groove disposed into a bottom of the spherical flow control element (3) wherein the valve body comprises a lower main body sealingly engaged with an upper bonnet; (4) a lower part of a respective outlet seat recess formed in the lower main body of the valve; (5) an upper part of the respective outlet seat recess formed in the bonnet; (6) wherein the bonnet and body together bias a respective one of the resilient members to load the seat, maintaining alignment of the ball and equalizing stresses, independently of end connection loads; the tool comprising:
an elongated member having a bottom appendage dimensioned to fit into the lower portion of the outlet seat recess between the main body and the resilient member, and a selectively retractable/extendable portion dimensioned to extend away from a face of the tool to engage an inner edge of the resilient member after the tool is inserted into position between the resilient member and the main body.

\* \* \* \* \*